US011897106B2

(12) United States Patent
Weber et al.

(10) Patent No.: US 11,897,106 B2
(45) **Date of Patent: *Feb. 13, 2024**

(54) PNEUMATIC FASTENER DRIVER

(71) Applicant: MILWAUKEE ELECTRIC TOOL CORPORATION, Brookfield, WI (US)

(72) Inventors: Andrew J. Weber, Cudahy, WI (US); James M. Wentzloff, West Bend, WI (US); Nicholas A. Albers, Pewaukee, WI (US); Bradley S. Helm, Milwaukee, WI (US); Troy C. Thorson, Cedarburg, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 62 days.

This patent is subject to a terminal disclaimer.

(21) Appl. No.: 17/403,974

(22) Filed: Aug. 17, 2021

(65) Prior Publication Data

US 2021/0370487 A1 Dec. 2, 2021

Related U.S. Application Data

(63) Continuation of application No. 16/193,277, filed on Nov. 16, 2018, now Pat. No. 11,110,577.

(60) Provisional application No. 62/590,687, filed on Nov. 27, 2017, provisional application No. 62/586,972, filed on Nov. 16, 2017.

(51) Int. Cl.

| | |
|---|---|
| ***B25C 1/04*** | (2006.01) |
| ***B25C 1/00*** | (2006.01) |
| ***B25C 1/06*** | (2006.01) |

(52) U.S. Cl.
CPC .............. *B25C 1/047* (2013.01); *B25C 1/005* (2013.01); *B25C 1/042* (2013.01); *B25C 1/06* (2013.01)

(58) Field of Classification Search
CPC .............. B25C 1/06; B25C 1/04; B25C 1/047
See application file for complete search history.

(56) References Cited

U.S. PATENT DOCUMENTS

| | | | | |
|---|---|---|---|---|
| 1,829,609 A * | 10/1931 | Robinson | B25D 9/08 60/542 |
| 2,698,938 A | 1/1955 | Stebbings | |
| 2,710,963 A | 6/1955 | Francis | |
| 2,781,515 A | 2/1957 | Juilfs | |

(Continued)

FOREIGN PATENT DOCUMENTS

| | | |
|---|---|---|
| CN | 202726856 U | 2/2002 |
| CN | 201711937 U | 1/2011 |

(Continued)

*Primary Examiner* — Andrew M Tecco
(74) *Attorney, Agent, or Firm* — Michael Best & Friedrich LLP

(57) ABSTRACT

A fastener driver includes a housing having a handle portion. A motor is positioned within the housing. The fastener driver further includes an air compressor including a compressor cylinder and a compressor piston movable within the compressor cylinder in a reciprocating manner to compress air within the compressor cylinder. The fastener driver further includes a drive train converting torque from the motor to a linear force applied to the compressor piston, causing the compressor piston to move in the reciprocating manner. At least a portion of the drive train extends through the handle portion of the housing.

20 Claims, 15 Drawing Sheets

(56) References Cited

U.S. PATENT DOCUMENTS

| | | | | |
|---|---|---|---|---|
| 2,983,922 | A | 5/1961 | Juilfs | |
| 3,065,560 | A | 11/1962 | Bumiller | |
| 3,072,911 | A | 1/1963 | Bumiller | |
| 3,174,672 | A | 3/1965 | Juilfs | |
| 3,266,697 | A | 8/1966 | Fiedler | |
| 3,320,860 | A | 5/1967 | Bade | |
| 3,387,541 | A | 6/1968 | Bade | |
| 3,407,709 | A | 10/1968 | Bade | |
| 3,568,780 | A * | 3/1971 | Matsuo | B25D 11/125 60/537 |
| 3,606,128 | A | 9/1971 | Cast et al. | |
| 3,771,710 | A | 11/1973 | Perkins et al. | |
| 3,821,992 | A | 7/1974 | Matsuo | |
| 3,878,902 | A * | 4/1975 | Matsuo | B25D 11/125 173/200 |
| 4,126,258 | A | 11/1978 | Martin et al. | |
| 4,197,974 | A | 4/1980 | Morton et al. | |
| 4,304,349 | A | 12/1981 | Novak et al. | |
| 4,436,236 | A | 3/1984 | Jobe | |
| 4,522,162 | A | 6/1985 | Nikolich | |
| 4,524,896 | A | 6/1985 | Morrell, Jr. | |
| 4,565,313 | A | 1/1986 | Buck et al. | |
| 4,597,517 | A | 7/1986 | Wagdy | |
| 4,630,766 | A | 12/1986 | Steeves et al. | |
| 4,688,710 | A | 8/1987 | Massari, Jr. et al. | |
| 4,784,306 | A | 11/1988 | Baum | |
| 4,898,316 | A | 2/1990 | McLaughlin et al. | |
| 5,368,213 | A | 11/1994 | Massari, Jr. | |
| 5,579,975 | A | 12/1996 | Moorman | |
| 5,593,079 | A | 1/1997 | Mukoyama et al. | |
| 5,615,985 | A | 4/1997 | Rose et al. | |
| 5,632,431 | A | 5/1997 | Lin | |
| 5,634,582 | A | 6/1997 | Morrison, Jr. et al. | |
| 5,697,541 | A | 12/1997 | Burke et al. | |
| 5,704,532 | A | 1/1998 | Wey | |
| 5,711,471 | A | 1/1998 | White | |
| 5,720,423 | A | 2/1998 | Kondo et al. | |
| 5,730,350 | A | 3/1998 | Lin | |
| 5,772,098 | A | 6/1998 | Crutcher | |
| 5,803,338 | A | 9/1998 | Singer et al. | |
| 5,836,400 | A | 11/1998 | Tupper et al. | |
| 5,927,585 | A | 7/1999 | Moorman et al. | |
| 6,036,072 | A | 3/2000 | Lee | |
| 6,155,472 | A | 12/2000 | Déziel | |
| 6,161,746 | A | 12/2000 | Wey | |
| 6,189,759 | B1 | 2/2001 | Canlas et al. | |
| 6,199,739 | B1 | 3/2001 | Mukoyama et al. | |
| 6,209,770 | B1 | 4/2001 | Perra | |
| 6,267,284 | B1 | 7/2001 | Clark | |
| 6,371,348 | B1 | 4/2002 | Canlas et al. | |
| 6,422,446 | B1 | 7/2002 | Liu | |
| 6,609,646 | B2 | 8/2003 | Miller et al. | |
| 6,648,202 | B2 | 11/2003 | Miller et al. | |
| 6,679,413 | B2 | 1/2004 | Miller et al. | |
| 6,772,931 | B2 | 8/2004 | Miller et al. | |
| 6,843,401 | B2 | 1/2005 | Favre-Bulle | |
| 6,845,896 | B2 | 1/2005 | Kral | |
| 6,857,549 | B1 | 2/2005 | Chen | |
| 6,938,812 | B2 | 9/2005 | Miller et al. | |
| 6,971,567 | B1 * | 12/2005 | Cannaliato | B25C 1/06 173/205 |
| 7,000,294 | B2 | 2/2006 | Kakuda et al. | |
| 7,004,367 | B1 | 2/2006 | Shen et al. | |
| 7,021,511 | B2 | 4/2006 | Popovich et al. | |
| 7,134,586 | B2 | 11/2006 | McGee et al. | |
| 7,175,063 | B2 | 2/2007 | Osuga et al. | |
| 7,185,712 | B2 | 3/2007 | Miller et al. | |
| 7,225,959 | B2 | 6/2007 | Patton et al. | |
| 7,273,160 | B2 | 9/2007 | Wey | |
| 7,494,035 | B2 | 2/2009 | Weaver et al. | |
| 7,506,694 | B2 | 3/2009 | Stirm et al. | |
| 7,527,106 | B2 | 5/2009 | Miller et al. | |
| 7,537,145 | B2 | 5/2009 | Gross et al. | |
| 7,665,540 | B2 | 2/2010 | Gross et al. | |
| 7,810,688 | B2 | 10/2010 | Wu et al. | |

| | | | | |
|---|---|---|---|---|
| 7,845,532 | B2 | 12/2010 | Burke et al. | |
| 7,913,890 | B2 | 3/2011 | Gross et al. | |
| 7,971,766 | B2 | 7/2011 | Tang | |
| 7,980,441 | B2 | 7/2011 | Dittrich et al. | |
| 8,011,441 | B2 | 9/2011 | Leimbach et al. | |
| 8,061,437 | B2 | 11/2011 | Liang | |
| 8,083,116 | B2 | 12/2011 | Liang | |
| 8,198,560 | B2 | 6/2012 | Kimata et al. | |
| 8,225,978 | B2 | 7/2012 | Gross et al. | |
| 8,267,295 | B2 | 9/2012 | Wu et al. | |
| 8,292,143 | B2 | 10/2012 | Lee et al. | |
| 8,336,748 | B2 | 12/2012 | Hlinka et al. | |
| 8,353,435 | B2 | 1/2013 | Gross et al. | |
| RE44,001 | E | 2/2013 | Pedicini et al. | |
| 8,561,869 | B2 | 10/2013 | Towfighi | |
| 8,567,654 | B2 | 10/2013 | Wu et al. | |
| 8,646,672 | B2 | 2/2014 | Wu et al. | |
| 8,716,908 | B2 | 5/2014 | Takeda et al. | |
| 8,746,526 | B2 | 6/2014 | Hlinka et al. | |
| 8,800,834 | B2 * | 8/2014 | Pedicini | B25C 1/06 60/370 |
| 8,833,626 | B2 | 9/2014 | Perron et al. | |
| 8,875,969 | B2 | 11/2014 | Pedicini et al. | |
| 9,050,712 | B2 | 6/2015 | Campbell | |
| 9,221,161 | B2 | 12/2015 | Miller et al. | |
| 9,463,541 | B2 | 10/2016 | Franz | |
| 9,473,053 | B2 | 10/2016 | Lim et al. | |
| 9,576,173 | B1 | 2/2017 | Mao | |
| 9,662,777 | B2 * | 5/2017 | Pomeroy | B25C 1/041 |
| 9,844,865 | B2 * | 12/2017 | Furuta | B25C 1/06 |
| 10,131,047 | B2 * | 11/2018 | Yanagihara | B25C 1/06 |
| 10,272,553 | B2 * | 4/2019 | Yang | B25C 1/008 |
| 10,525,577 | B2 * | 1/2020 | Masatoshi | B25D 9/08 |
| 11,110,577 | B2 * | 9/2021 | Weber | B25C 1/06 |
| 2003/0146262 | A1 | 8/2003 | Hwang et al. | |
| 2004/0108353 | A1 | 6/2004 | Wolf et al. | |
| 2005/0001007 | A1 | 1/2005 | Butzen et al. | |
| 2006/0180631 | A1 | 8/2006 | Pedicini et al. | |
| 2006/0249554 | A1 | 11/2006 | Butzen et al. | |
| 2008/0041911 | A1 | 2/2008 | Lee | |
| 2008/0245840 | A1 | 10/2008 | Beauclair et al. | |
| 2009/0090762 | A1 * | 4/2009 | Leimbach | B25C 5/13 227/136 |
| 2010/0032468 | A1 | 2/2010 | Gross et al. | |
| 2010/0124692 | A1 | 5/2010 | Schiestl | |
| 2011/0180581 | A1 | 7/2011 | Liang et al. | |
| 2011/0198381 | A1 * | 8/2011 | McCardle | B25C 1/047 227/8 |
| 2011/0227429 | A1 | 9/2011 | Takeda et al. | |
| 2012/0286014 | A1 * | 11/2012 | Pedicini | B25C 1/04 227/4 |
| 2013/0082083 | A1 | 4/2013 | Largo | |
| 2013/0082085 | A1 | 4/2013 | Argo | |
| 2013/0336809 | A1 | 12/2013 | Antoun et al. | |
| 2014/0088753 | A1 | 3/2014 | Lim et al. | |
| 2014/0103840 | A1 | 4/2014 | Lim | |
| 2015/0053736 | A1 * | 2/2015 | Pomeroy | B25C 5/13 227/156 |
| 2015/0096776 | A1 | 4/2015 | Garber | |
| 2015/0122868 | A1 | 5/2015 | Campbell | |
| 2015/0129630 | A1 * | 5/2015 | Matsuno | B25C 1/06 227/130 |
| 2015/0158160 | A1 | 6/2015 | Kato | |
| 2015/0174748 | A1 * | 6/2015 | Furuta | B25C 1/06 227/130 |
| 2015/0202755 | A1 | 7/2015 | Tanji | |
| 2015/0217436 | A1 * | 8/2015 | Yanagihara | B25C 1/04 29/432 |
| 2015/0314432 | A1 * | 11/2015 | Yang | B25C 1/06 227/8 |
| 2015/0375381 | A1 | 12/2015 | Tanji | |
| 2016/0207186 | A1 | 7/2016 | Bruggmueller et al. | |
| 2016/0214247 | A1 | 7/2016 | Lee | |
| 2016/0214249 | A1 | 7/2016 | Bruggmueller et al. | |
| 2017/0001291 | A1 | 1/2017 | Schnell et al. | |
| 2017/0043463 | A1 | 2/2017 | Schnell et al. | |
| 2019/0143498 | A1 | 5/2019 | Weber et al. | |

(56) References Cited

U.S. PATENT DOCUMENTS

FOREIGN PATENT DOCUMENTS

| | | | |
|---|---|---|---|
| CN | 202367706 | U | 8/2012 |
| CN | 103846867 | A | 6/2014 |
| CN | 203650448 | U | 6/2014 |
| CN | 204487492 | U | 7/2015 |
| CN | 104858839 | B | 8/2016 |
| DE | 1603942 | A1 | 9/1971 |
| DE | 1603943 | A1 | 3/1972 |
| DE | 2923997 | A1 | 1/1980 |
| DE | 7917080 | U1 | 5/1984 |
| DE | 20013428 | U1 | 1/2001 |
| EP | 86244 | A1 | 8/1983 |
| EP | 100105 | A2 | 2/1984 |
| EP | 550156 | A1 | 7/1993 |
| GB | 2025562 | A | 1/1980 |
| WO | 2008032861 | A1 | 3/2008 |
| WO | 2011010511 | A1 | 1/2011 |
| WO | 2011010512 | A1 | 1/2011 |
| WO | 2013161909 | A1 | 10/2013 |
| WO | 2014061807 | A1 | 4/2014 |
| WO | 2014073669 | A1 | 5/2014 |
| WO | 2014084221 | A1 | 6/2014 |
| WO | 2014084222 | A1 | 6/2014 |
| WO | 2014087934 | A1 | 6/2014 |

* cited by examiner

PNEUMATIC FASTENER DRIVER

CROSS-REFERENCE TO RELATED APPLICATIONS

This application is a continuation of U.S. patent application Ser. No. 16/193,277 filed on Nov. 16, 2018, now U.S. Pat. No. 11,110,577, which claims priority to U.S. Provisional Patent Application No. 62/586,972 filed on Nov. 16, 2017 and U.S. Provisional Patent Application No. 62/590,687 filed on Nov. 27, 2017, the entire contents of all of which are incorporated herein by reference.

FIELD OF THE INVENTION

The present invention relates to pneumatic fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.), but often these designs are met with power, size, and cost constraints.

SUMMARY OF THE INVENTION

The present invention provides, in one aspect, a fastener driver including a housing having a handle portion. A motor is positioned within the housing. The fastener driver further includes an air compressor including a compressor cylinder and a compressor piston movable within the compressor cylinder in a reciprocating manner to compress air within the compressor cylinder. The fastener driver further includes a drive train converting torque from the motor to a linear force applied to the compressor piston, causing the compressor piston to move in the reciprocating manner. At least a portion of the drive train extends through the handle portion of the housing.

The present invention provides, in another aspect, a fastener driver including a housing having a head portion, a battery attachment portion, and a handle portion extending therebetween. A motor is positioned within the battery attachment portion. A battery pack is coupled to the battery attachment portion for providing power to the motor. The fastener driver further includes an air compressor including a compressor cylinder and a compressor piston movable within the compressor cylinder in a reciprocating manner to compress air within the compressor cylinder. The fastener driver further includes a drive train converting torque from the motor to a linear force applied to the compressor piston, causing the compressor piston to move in the reciprocating manner. The drive train includes a drive shaft extending through the handle portion.

The present invention provides, in yet another aspect, a fastener driver including a housing, and a motor positioned within the housing. The fastener driver further includes an air compressor including a compressor cylinder, a head coupled to the compressor cylinder, and a compressor piston movable within the compressor cylinder in a reciprocating manner by the motor to compress air within the compressor cylinder. A drive cylinder is in selective fluid communication with the compressor cylinder. The drive cylinder extends between a first end and a second end. A drive piston is slidably disposed in the drive cylinder. The drive piston has a drive blade attached thereto. A valve is positioned between the head and the first end of the drive cylinder. The valve is movable between an open position, in which the drive cylinder is in fluid communication with the compressor cylinder, and a closed position. A spring biases the valve toward the first end into the closed position. The valve includes a flange having a first side in facing relationship with the first end of the drive cylinder, and an opposite second side. A surface area of the second side of the flange exposed to the compressed air within the compressor cylinder is greater than a surface area of the first side of the flange exposed to the compressed air within the compressor cylinder, thereby maintaining the valve in the closed position.

The present invention provides, in still yet another aspect, a fastener driver including a housing having a handle portion. A trigger mechanism is mounted on the handle portion. The trigger mechanism includes a first trigger for initiating a fastener driving operation and a second trigger. Each trigger is movable between a first position and a second position. A circuit board is positioned within the handle portion. The circuit board includes a first switch configured to be actuated by the first trigger when moving from the first position to the second position, and a second switch configured to be actuated by the second trigger. The second trigger, when in the first position, blocks movement of the first trigger from the first position to the second position The present invention provides, in another aspect, a fastener driver including a housing having a handle portion. A trigger is mounted to the handle portion. A magazine is coupled to the housing and configured to receive fasteners. The fastener driver further includes a nosepiece through which consecutive fasteners from the magazine are driven. The fastener driver further includes a dry-fire lockout mechanism having a latch pivotably coupled to the magazine, and a link is coupled to the trigger for movement with the trigger. The latch is pivotable between a first position, in which the latch is disengaged from the link, and a second position, in which the latch is engaged with the link and inhibits movement of the link, and therefore the trigger, in response to the trigger being depressed. The latch moves from the first position to the second position in response to a number of fasteners remaining in the magazine being less than a predetermined value.

The present invention provides, in yet another aspect, a fastener driver including a housing, a drive cylinder positioned in the housing, and a drive piston slidably disposed in the drive cylinder from a first position to a second position during a fastener driving operation. The drive piston has a drive blade attached thereto. A magazine is coupled to the housing and is configured to receive a collated strip of fasteners. The magazine includes a pusher positioned for biasing the collated strip of fasteners toward a first end of the magazine, and a base in which the pusher is supported. The base defines a plurality of slots. A cover is attachable to the base. The cover defines a continuous channel in facing relationship with the slots. The channel includes a back wall. A plurality of pins is slidably positioned in the magazine for movement with the pusher. Each pin is received within a respective slot, and each pin has an end extending into the channel from the slot. Each slot includes a slanted portion oriented at an oblique angle with respect to the back wall such that the end of each pin is positioned at the oblique angle relative to the back wall.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
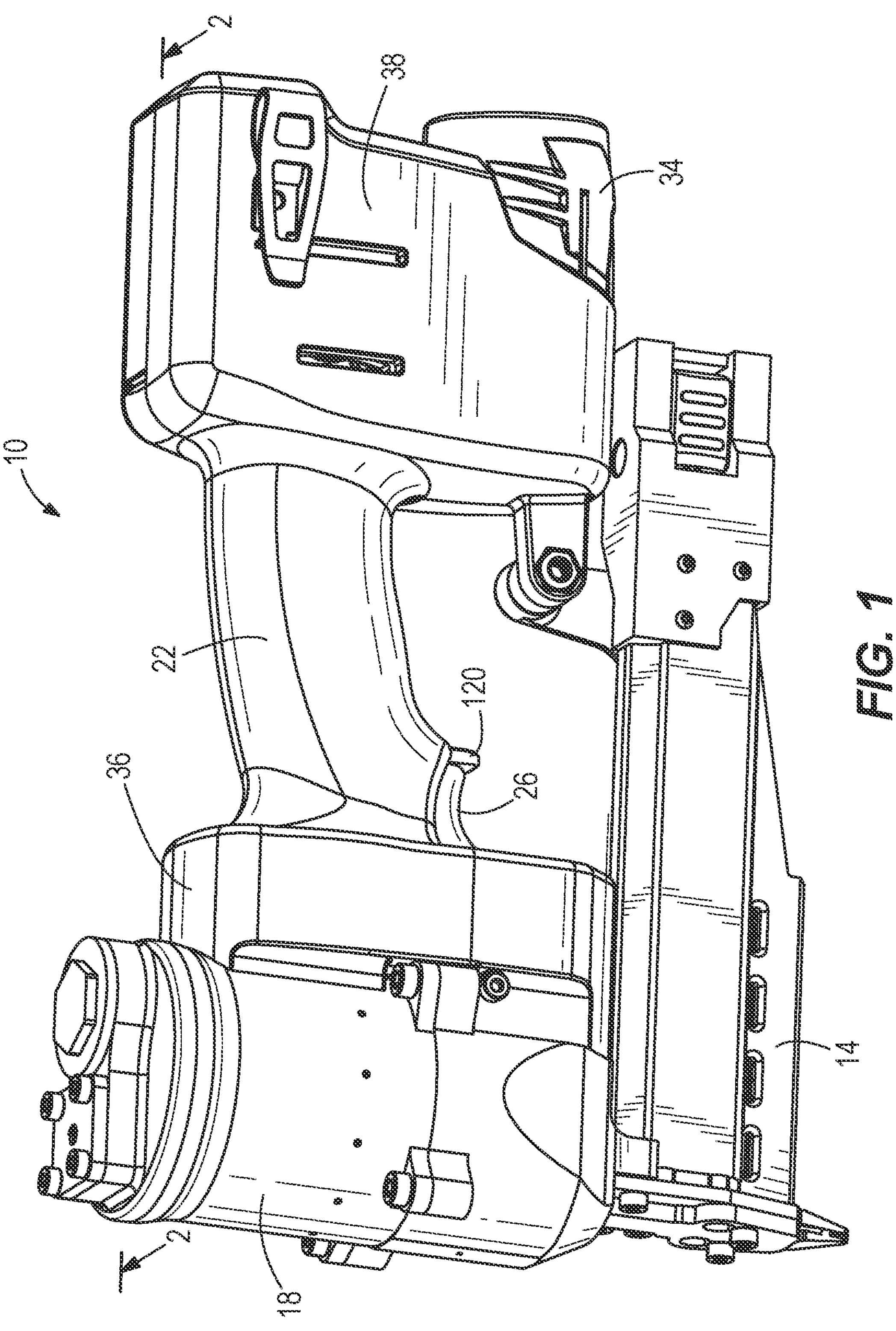
FIG. 1 is a perspective view of a pneumatic fastener driver.

With reference to FIG. 1, a pneumatic fastener driver 10 is operable to drive fasteners 164 (FIG. 6A) (e.g., nails, tacks, staples, etc.) held within a magazine 14 into a workpiece. The pneumatic fastener driver 10 includes an outer housing 18 with a handle portion 22, and a user-actuated trigger 26 mounted on the handle portion 22. The pneumatic fastener driver 10 does not require an external source of air pressure, but rather includes an on-board air compressor 30 (FIG. 2) positioned within a head portion 36 the outer housing 18. The on-board air compressor 30 is powered by a power source (e.g., a battery pack 34), coupled to a battery attachment portion 38 of the outer housing 18.

Figure 2:
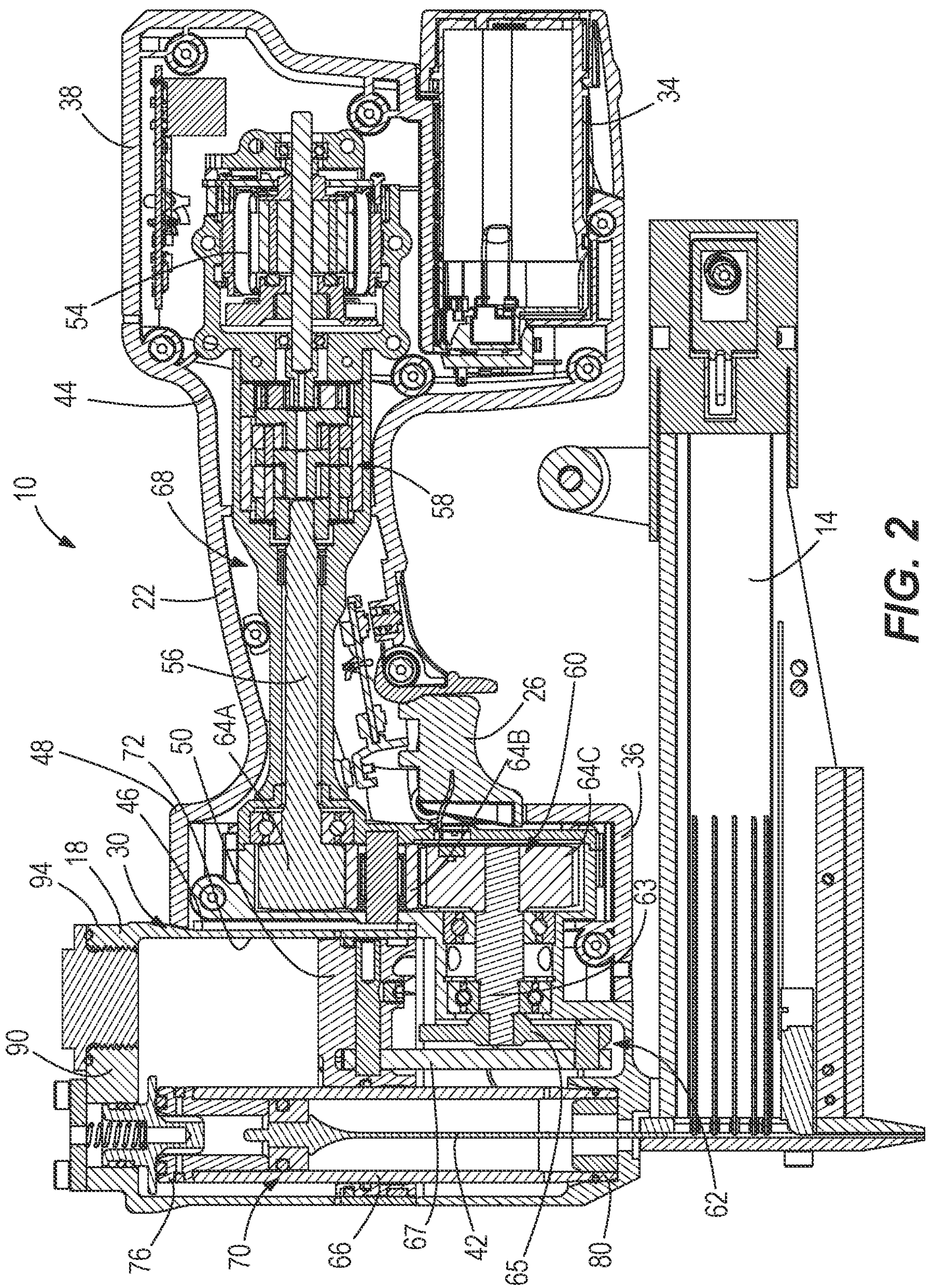
FIG. 2 is a side cross-sectional view of the pneumatic fastener driver of FIG. 1 taken along line 2-2 in FIG. 1, illustrating a compressor 30 and a motor 54.

With reference to FIGS. 2 and 3A-3F, the pneumatic fastener driver 10 includes a drive blade 42 actuated by the on-board air compressor 30 to drive the fasteners 164 into a workpiece. The compressor 30 includes a compressor cylinder 46 and a compressor piston 50 in the compressor cylinder 46 (FIG. 2). The compressor piston 50 is driven in a reciprocating manner by a motor 54 and a drive train 68 interconnecting the motor 54 and the compressor piston 50. The drive train 68 includes a transmission 58 that receives torque from the motor 54, a drive shaft 56 connected to the output of the transmission 58, a gear train 60 driven by the drive shaft 56, and a crank arm assembly 62 connected to the output of the gear train 60. The gear train 60 is positioned within the head portion 36 adjacent the compressor cylinder 46, and includes a first gear 64A coupled for co-rotation with the drive shaft 56, a second idler gear 64B meshed with the first gear 64A, and a third gear 64C meshed with the second gear 64B (FIG. 2). The crank arm assembly 62 includes a crank shaft 63 coupled for co-rotation with the third gear 64C, a crank arm 65 located on an opposite side of the crank shaft 63, and a connecting rod 67 pivotably coupling the compressor piston 50 and the crank arm 65. Each of the transmission 58 and the gear train 60 is configured to reduce a rotational speed of the motor 54. As such, the transmission 58 may be a first speed reduction mechanism, and the gear train 60 may be a second speed reduction mechanism.

With specific reference to FIG. 2, the motor 54 is positioned within the battery attachment portion 38 adjacent a first end 44 of the handle portion 22, with the transmission 58 and the drive shaft 56 extending through the handle portion 22. The gear train 60 operatively coupled to the drive shaft 56 is positioned proximate a second end 48 of the handle portion 22. As such, a portion of the drive train 68 (e.g., the transmission 58 and the drive shaft 56) is positioned within the handle portion 22. Furthermore, the transmission 58 or first speed reduction mechanism is positioned upstream of the drive shaft 56, and the gear train 60 or second speed reduction mechanism is positioned downstream of the drive shaft 56. In other words, the drive train

68 includes a split gearbox configuration, with speed reduction occurring both upstream of the drive shaft 56 (by the transmission 58) and downstream of the drive shaft 56 (by the gear train 60). Therefore, this configuration makes the fastener driver 10 more compact than it otherwise would be with all of the speed reduction occurring in a single gearbox. In addition, this configuration allows the user to hold the pneumatic fastener driver 10 at a small distance offset from the workpiece for easy, accurate use of the fastener driver 10, which results in improved balance and manipulation of the fastener driver 10 during use.

Figure 3A:
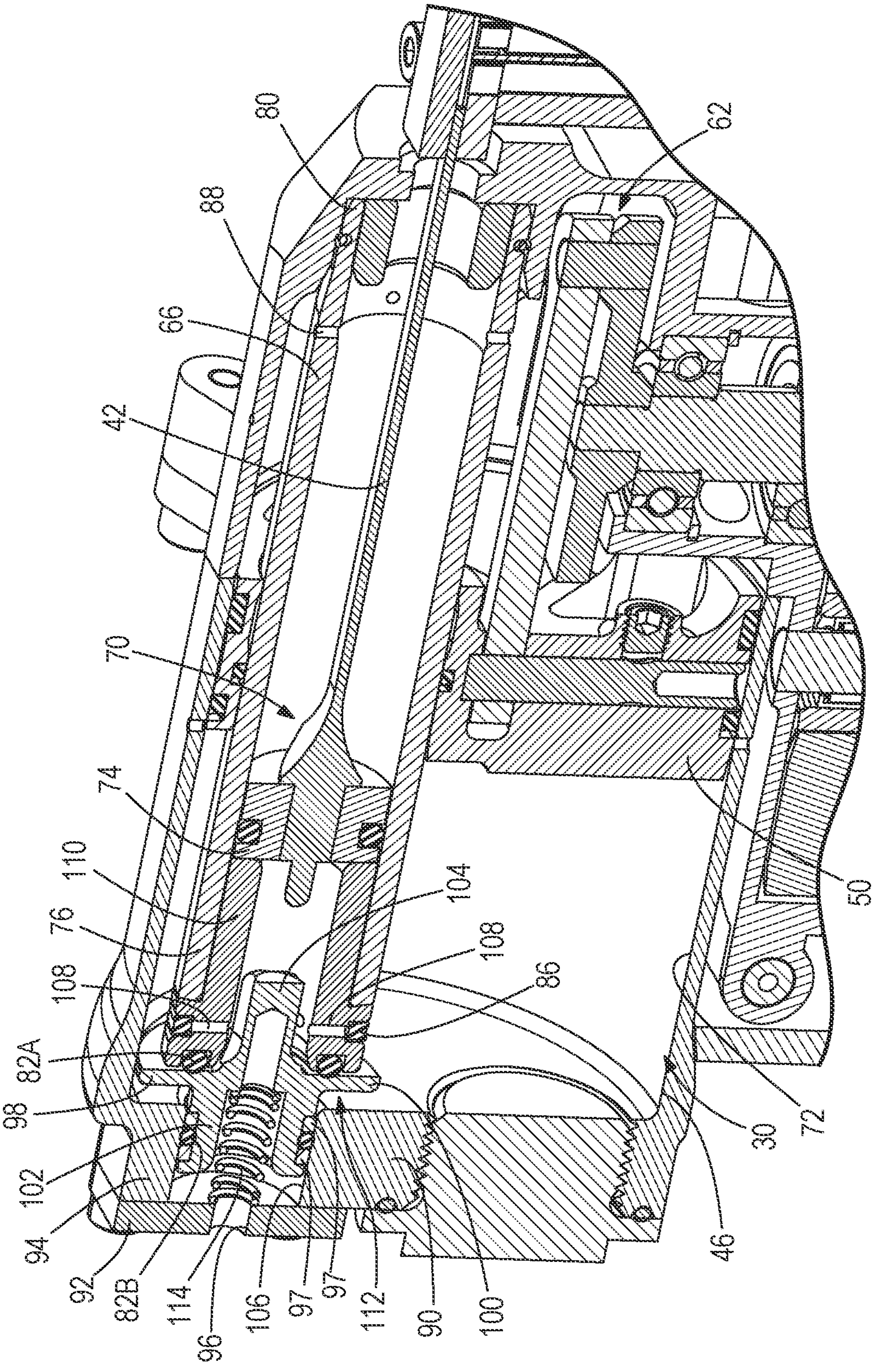
FIG. 3A an enlarged, partial cross-sectional view illustrating the compressor 30 of the pneumatic fastener driver of FIG. 2.

The pneumatic fastener driver 10 also includes a drive cylinder 66 in selective fluid communication with the compressor cylinder 46 and a drive piston 70 slidably disposed in the drive cylinder 66. As shown in FIG. 3A, the smaller drive cylinder 66 is located inside the larger compressor cylinder 46 for a cylinder-in-a-cylinder configuration. The compressor piston 50 includes a bore 72 through which the drive cylinder 66 extends from a first end 76 to a second end 80. The drive piston 70 further includes a body 74 and the drive blade 42 extending from the body 74 of the drive piston 70 within the drive cylinder 66. The drive piston 70 is movable between a top-dead-center position (FIGS. 3A-3C) and a bottom-dead-center position (FIGS. 3D and 3E). Specifically, the drive piston 70 is in the top-dead-center position when at the first end 76 of the drive cylinder 66 and in the bottom-dead-center position when at the second end 80 of the drive cylinder 66. The drive cylinder 66 includes a cylindrical opening 88 positioned at the second end 80 of the drive cylinder 66 and formed therein to vent excess pressure in the drive cylinder 66 when the drive piston 70 moves towards the bottom-dead-center position. Specifically, the opening 88 is configured to vent air within the drive cylinder 66 and beneath the drive piston 70 during the movement of the drive piston 70 from the top-dead-center position to the bottom-dead-center position. Similarly, the compressor piston 50 is moveable between a bottom-dead-center position (FIGS. 3A and 3B) and a top-dead-center position (FIG. 3C-3E).

With continued reference to FIG. 3A, the compressor cylinder 46 includes an integral head 90 formed at a top end 94 of the compressor cylinder 46 (i.e., the head 90 and the cylinder 46 are formed as a single component). The integral compressor cylinder 46 and cylinder head 90 may be manufactured by, for example, a deep-drawing process or an impact extrusion process. The drive cylinder 66 may also be formed using either of the above-mentioned processes with an integral cylinder head. The illustrated head 90 includes a cover 92 adjacent an end of the head 90.

A hole 106 defined by the head 90 is formed above the drive cylinder 66. A valve 98 is positioned within the hole 106 and includes a flange 100. The flange 100 divides the valve 98 into a guide portion 102, which is positioned within the hole 106, and a stem portion 104. The stem portion 104 is positioned within the first end 76 of the drive cylinder 66. A cylindrical insert 110 is positioned within the drive cylinder 66 at the first end 76. A gap 112 is defined between the head 90 and the insert 110 in which the flange 100 is located. A spring member 114 is positioned between the cover 92 and the valve 98 within the hole 106. Specifically, the spring member 114 biases the flange 100 of the valve 98 against the insert 110. An O-ring 82A is positioned between the flange 100 and the insert 110, and an additional O-ring 82B is positioned between the guide portion 102 and the head 90 within the hole 106. The O-ring 82A provides a seal between the compressor cylinder 46 and the drive cylinder 66, whereas the O-ring 82B provides a seal between the compressor cylinder 46 and the outside atmosphere. In particular, the cover 92 defines an opening 96 (FIG. 3A) in fluid communication with the hole 106 defined by the head 90. As such, the guide portion 102 of the valve 98 is exposed to the outside atmosphere. In the illustrated embodiment, the O-ring 82B is positioned between two retaining rings 97. In addition, the O-ring 82B and the two retaining rings 97 are positioned between annular flange sections 102A (FIG. 4A) of the guide portion 102.

The insert 110 further includes a plurality of ports 108 positioned at the first end 76 of the drive cylinder 66 and formed therein to vent air from within the drive cylinder 66 to the compressor cylinder 46. An O-ring 86, having a circular or non-circular cross-sectional shape, or other sealing member, is positioned around the outer periphery of the insert 110 and surrounding the ports 108, only two of which are shown in FIGS. 3A-3F. The O-ring 86 functions as a one-way valve to enable fluid communication between the compressor cylinder 46 and the drive cylinder 66 during return of the compressor piston 50 to the bottom-dead-center position. Likewise, as the compressor piston 50 nears its top-dead-center position, the gap 112 may also fluidly communicate the compressor cylinder 46 and the drive cylinder 66 when the valve 98 is unseated from the O-ring 82A as described in further detail below.

In operation, the compressor piston 50 is driven from the bottom-dead center position to the top-dead-center position (FIGS. 3B to 3D in sequence) and the drive piston 70 is driven from the top-dead-center position (FIG. 3C) to the bottom-dead-center position (FIG. 3D) for driving one of the fasteners 164 into the workpiece. The drive piston 70 is then returned to the top-dead-center position as the compressor piston 50 returns to the bottom-dead-center position (sequence from FIGS. 3D to 3F, and back to FIG. 3B) for preparing the pneumatic fastener driver 10 for a subsequent fastener driving operation.

Figure 3B:
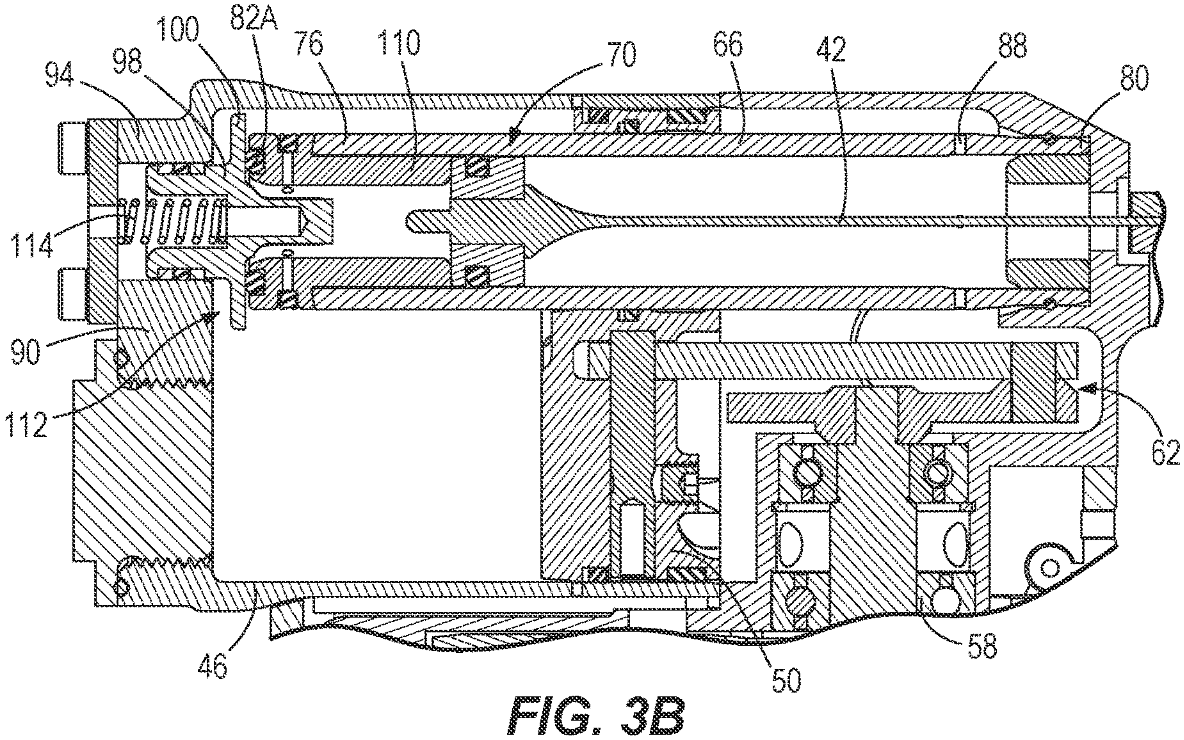
FIG. 3B is another enlarged, partial cross-sectional view illustrating a compressor piston in a bottom-dead-center position, a drive piston in a top-dead-center position, and a valve of the compressor in a closed position.
Figure 3C:
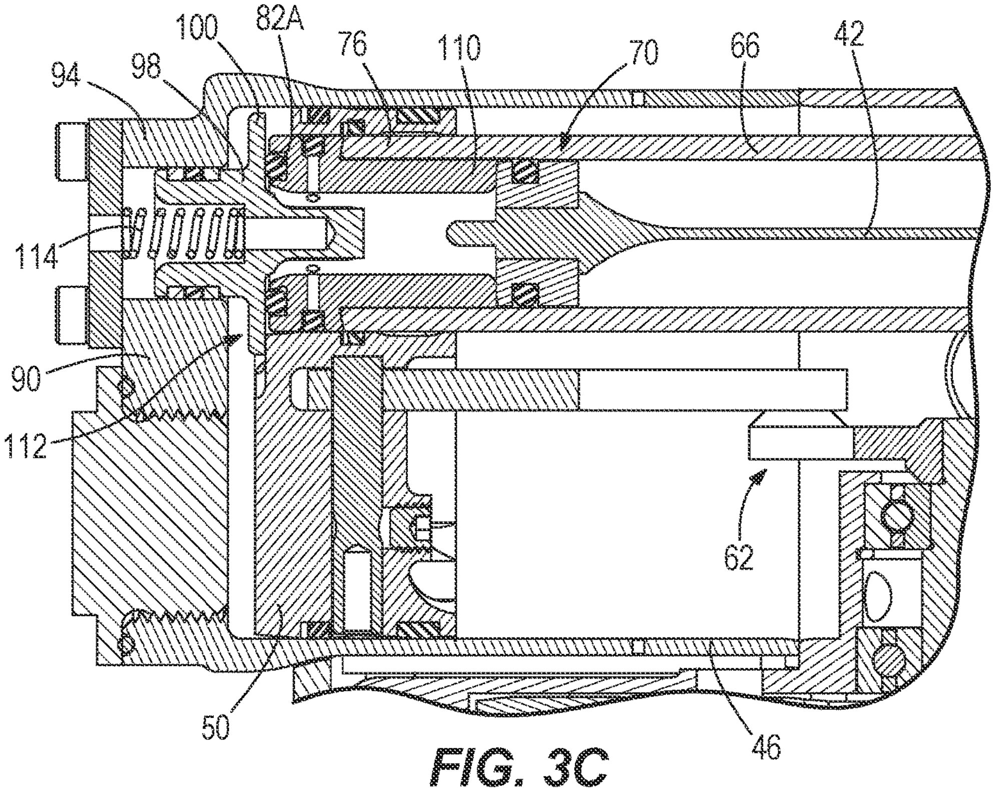
FIG. 3C is yet another enlarged, partial cross-sectional view illustrating the compressor piston near a top-dead-center position as the drive piston remains in the top-dead-center position of FIG. 3B.
Figure 3D:
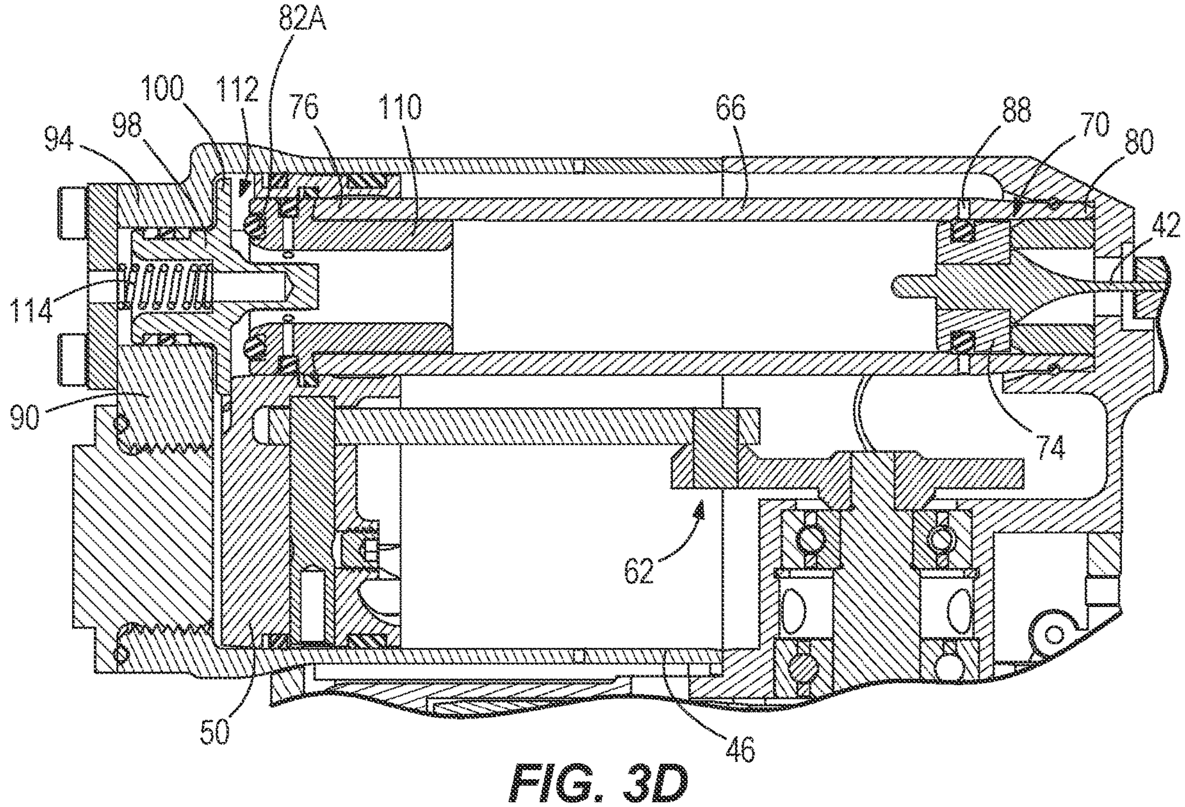
FIG. 3D is yet still another enlarged, partial cross-sectional view illustrating the valve in an open position and the compressor piston in the top-dead-center positon.
Figure 3E:
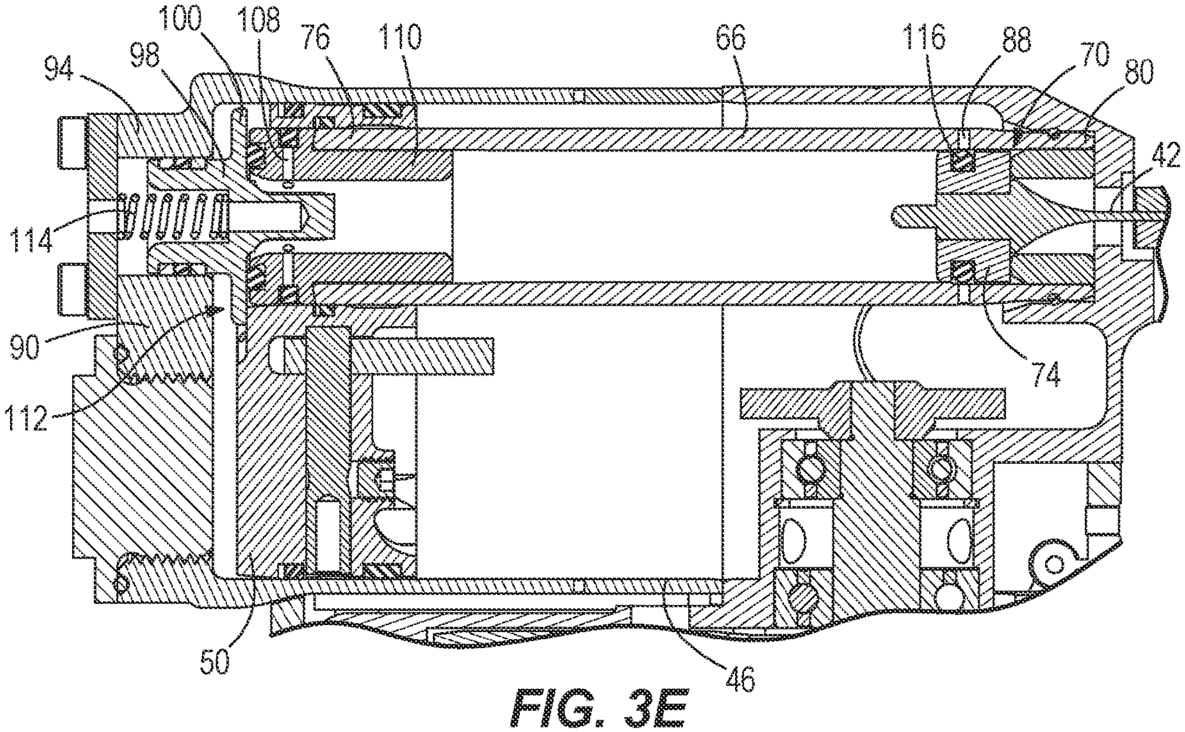
FIG. 3E is another enlarged, partial cross-sectional view illustrating the compressor piston just below the top-dead-center position of FIG. 3D, the drive piston in a bottom-dead-center position, and the valve returned to the closed position of FIG. 3B.

More specifically, at the beginning of a fastener driving operation as shown in FIG. 3B, the compressor piston 50 is in the bottom-dead-center position, while the drive piston 70 is in the top-dead-center position. When the user of the driver 10 depresses the trigger 26, the piston 50 is driven upward and toward the top end 94 of the compressor cylinder 46 by the motor 54 and crank arm assembly 62 (FIG. 3C). As the compressor piston 50 travels upward, the air in the compressor cylinder 46 above the compressor piston 50 is compressed. The force of the compressed air F3A, F3B on the valve 98 keeps the valve 98 in a closed (i.e., sealed) position until the compressor piston 50 contacts the valve flange 100, after which the flange 100 is unseated from the O-ring 82A by the compressor piston 50 as it reaches its top-dead-center position (FIG. 3D), fluidly communicating the first end 76 of the drive cylinder 66 with the compressor cylinder 46 via the gap 112. As such, the valve 98 is in an open position in which the drive cylinder 66 receives the compressed air from the compressor cylinder 46. The compressed air also acts upon the drive piston 70 positioned within the drive cylinder 66.

Figure 4A:
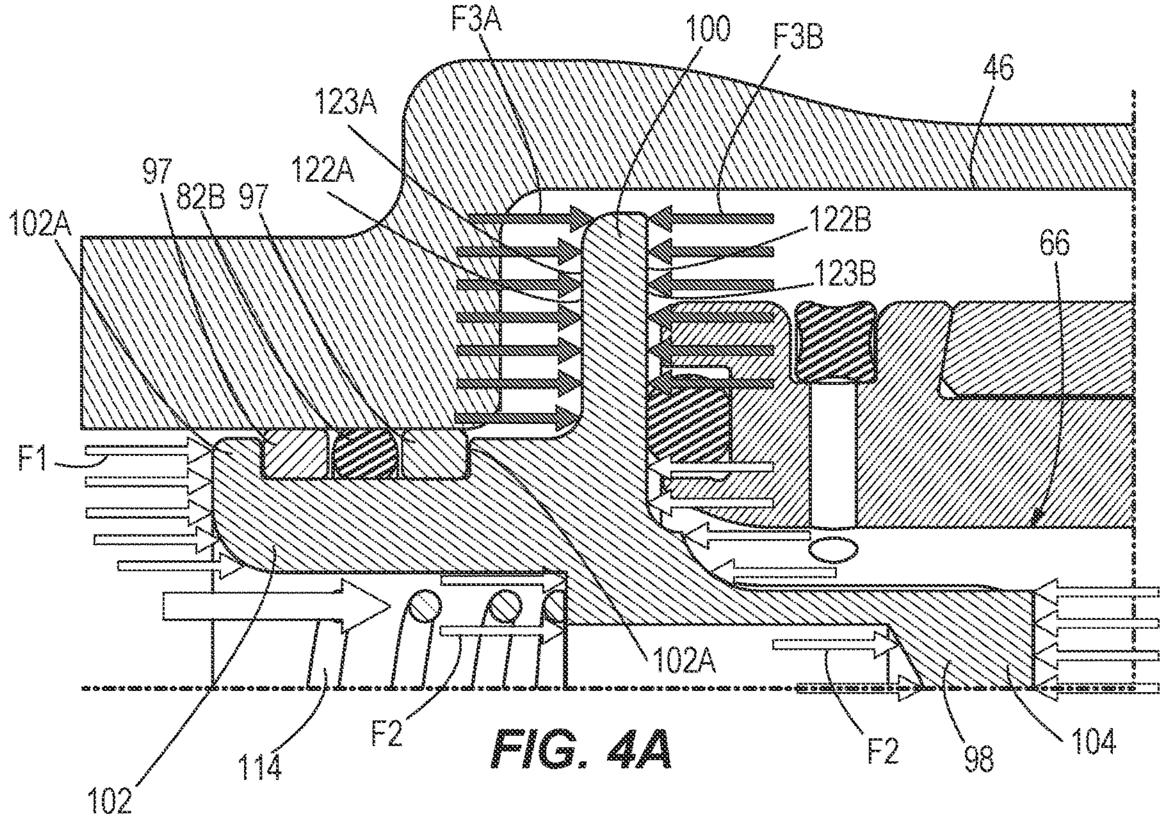
FIG. 4A is an enlarged, partial cross-sectional view of the valve of FIG. 3B in the closed position.

With reference to FIG. 4A, the valve 98 is maintained in the closed position due to a combination of atmospheric force F1, spring force F2 from the spring member 114, and the force of the compressed air F3A on a first side 122A of the flange 100. In particular, the first side 122A of the flange 100 has a surface area 123A (i.e., the area exposed to the force of the compressed air F3 on the first side 122A). The flange 100 further includes a second side 122B opposite the first side 122A upon which the force of the compressed air F3B also acts. The second side 122B is in facing relationship with the first end 76 of the drive cylinder 66 and has a surface area 123B (i.e., the area exposed to the force F3B on the second side 122B). The surface area 123B of the second side 122B of the flange 100 may also include the surface area of the stem portion 104. When the valve 98 is in the closed position, the surface area 123A of the first side 122A of the flange 100 exposed to the compressed air within the compressor cylinder 46 is greater than the surface area 123B of the second side 122B of the flange 100 exposed to the compressed air within the compressor cylinder 46. Therefore, the resulting force of the compressed air F3B on the second side 122B of the flange 100 is less than the resulting force of the compressed air F3A acting on the first side 122A of the flange 100 (FIG. 4A), thereby maintaining the valve 98 is the closed position, and preventing the compressed air in the compressor cylinder 46 alone from moving the valve 98 from the closed position to the open position. In addition, the spring force F2 biasing the valve 98 toward the insert 110, and the atmospheric force F1 applied to the guide portion 102 of the valve 98 further aids in maintaining the valve 98 in the closed position.

Figure 4B:
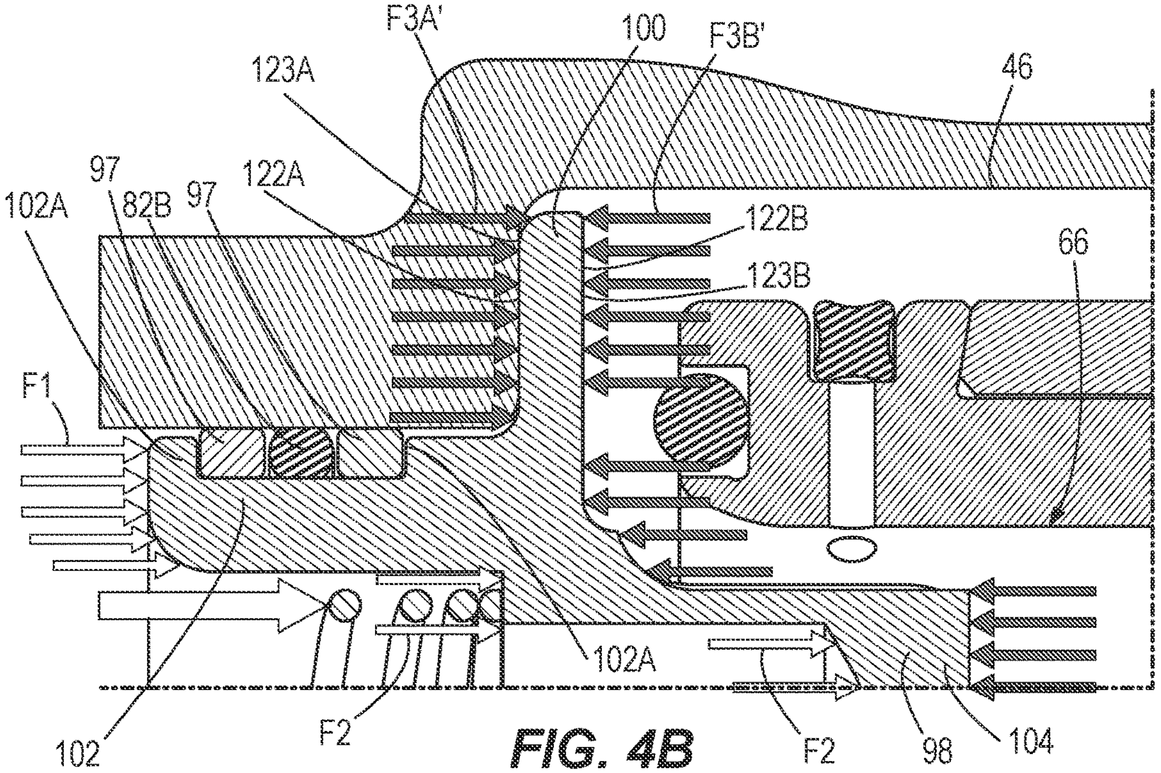
FIG. 4B is an enlarged, partial cross-sectional view of the valve of FIG. 3D in the open position.

The valve 98 moves from the closed position to the open position only when the compressor piston 50 reaches its top-dead-center position and unseats the valve 98, as shown in FIGS. 3D and 4B. Subsequently, the compressed air from the compressor cylinder 46 flows into the drive cylinder 66 via the gap 112. The surface area 123B of the second side 122A of the flange 100 exposed to the compressed air within the compressor cylinder 46 is now greater than the surface area 123A the first side 122B of the flange 100 exposed to the compressed air within the compressor cylinder 46. Therefore, the force of the compressed air F3B' on the second side 122B of the flange 100 is now greater than the combination of the atmospheric force F1, the spring member force F2, and the force of compressed air F3A' on the first side 122A of the flange 100 (FIG. 4B) such that the compressed air holds the valve 98 in the open position. In other words, the surface area 123B of the second side 122B that is exposed to the force of compressed air F3B' is greater than the surface area 123A of the first side 122A that is exposed to the force of compressed air F3A' when the valve 98 is in the open position, resulting in a larger force F3B' applied to the second side 122B of the valve 98 to maintain the valve 98 in the open position.

With reference to FIG. 3D, the drive piston 70 is driven from the top-dead-center position to the bottom dead center position by the compressed air entering the first end 76 of the drive cylinder 66. As the drive piston 70 is driven downwards, the drive blade 42 impacts the fastener 164 held in the magazine 14 and drives the fastener 164 into the workpiece until the drive piston 70 reaches the bottom-dead-center position. Just before the drive piston 70 reaches the bottom-dead-center position, any compressed air still acting on the drive piston 70 is vented from the drive cylinder 66 through the opening 88 to the atmosphere.

With reference to FIG. 3E, to prepare for a subsequent fastener driving operation, the compressor piston 50 begins its return stroke and the valve 98 is closed (i.e., the flange 100 moves adjacent the insert 110) via the bias of the spring member 114. In addition, an O-ring 116 positioned on the body 74 of the drive piston 70 blocks the opening 88 from further fluid communication to the atmosphere.

Figure 3F:
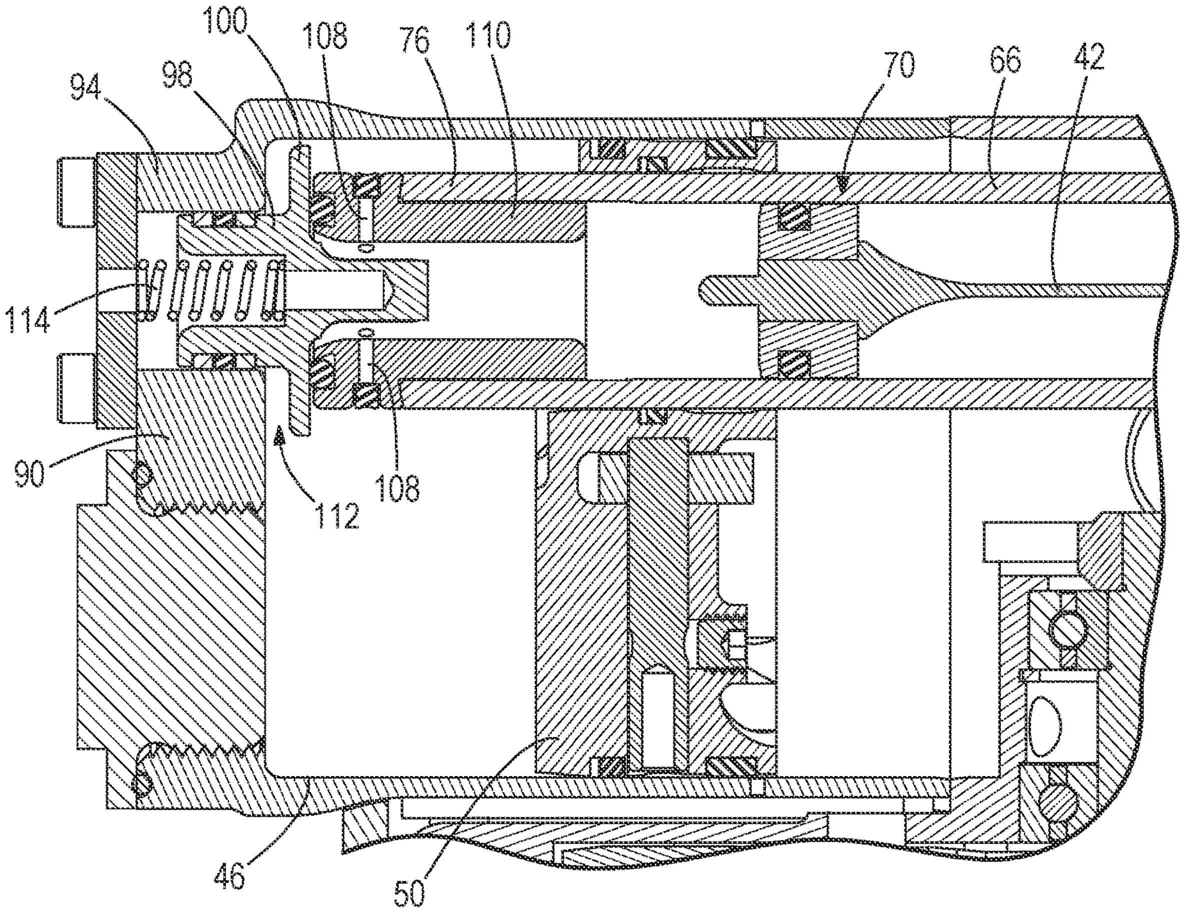
FIG. 3F is yet another enlarged, partial cross-sectional view illustrating the compressor piston returning to the bottom-dead-center position of FIG. 3B and the drive piston returning to the top-dead-center position of FIG. 3B.

With reference to FIG. 3F, the compressor piston 50 is driven downwards towards the bottom-dead-center position by the motor 54 and crank arm assembly 62 (FIG. 2). As the compressor piston 50 is driven downward, a vacuum is created within the compressor cylinder 46 and the drive cylinder 66, between the compressor piston 50 and the drive piston 70. The O-ring 86 surrounding the ports 108 functions as a one-way valve through which air flows from the drive cylinder 66 to the compressor cylinder 46 in response to the vacuum developed in the compressor cylinder 46. The vacuum draws the drive piston 70 upwards in the drive cylinder 66 toward the first end 76 due to the compressor cylinder 46 in fluid communication with the drive cylinder 66 via the ports 108 when the compressor piston 50 is driven downwards towards the bottom-dead-center position. Consequently, the drive piston 70 returns to the top-dead-center positon as the compressor piston 50 returns to the bottom-dead-center position such that the pneumatic fastener driver 10 is operable for a subsequent fastener driving operation.

Figure 5A:
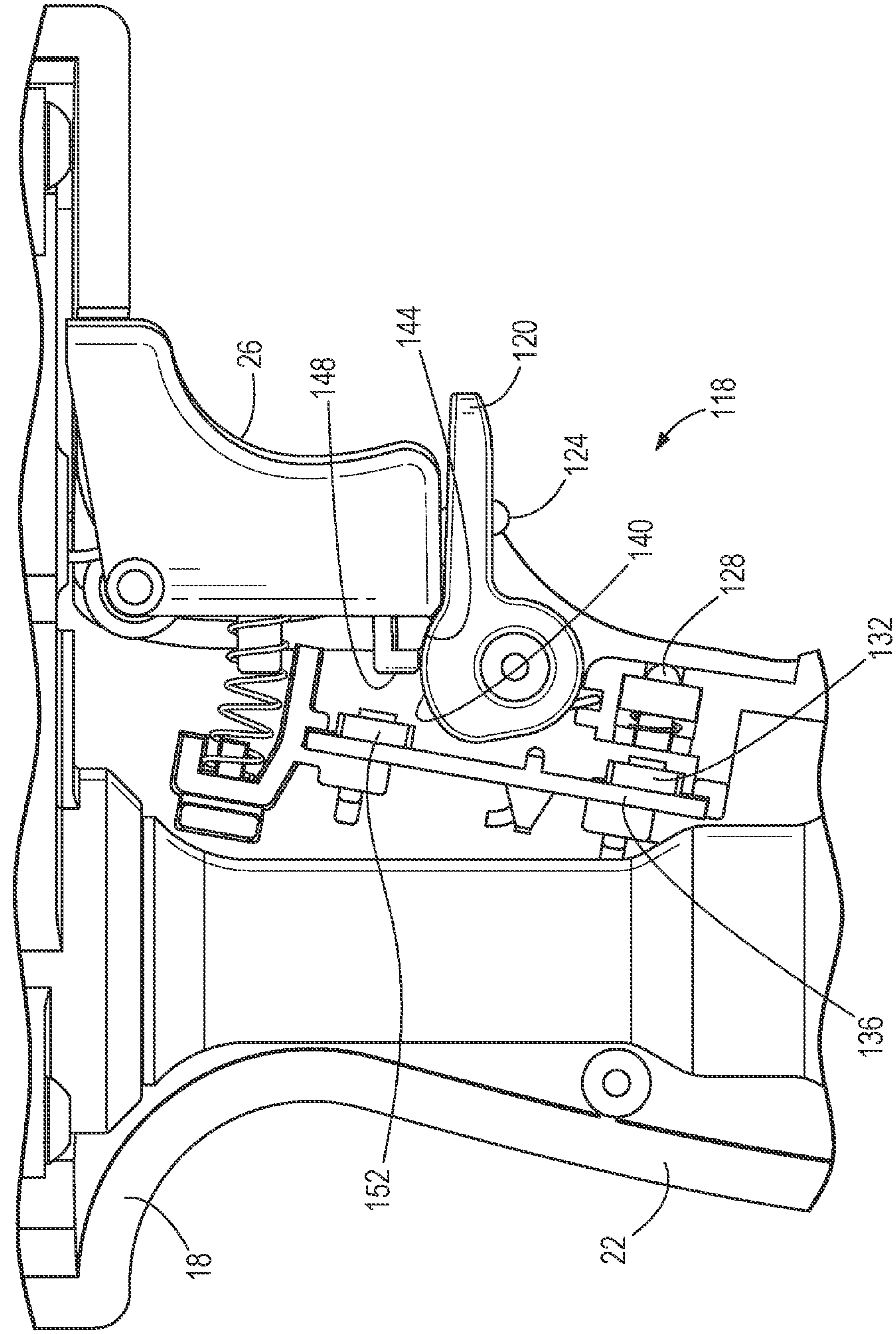
FIG. 5A is an enlarged, partial cross-sectional view of a trigger mechanism of the pneumatic fastener driver of FIG. 1 in a first position.
Figure 5B:
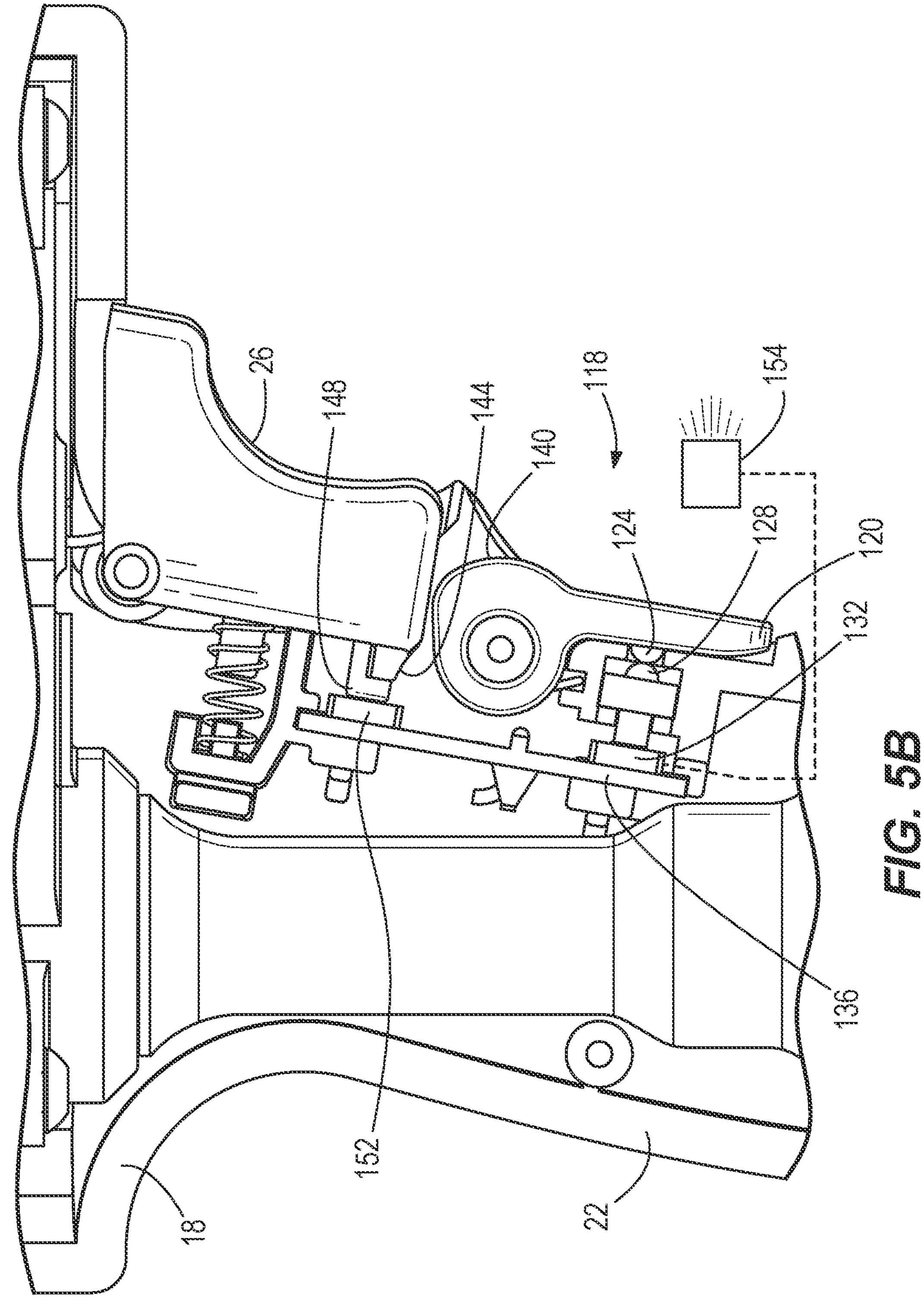
FIG. 5B is an enlarged, partial cross-sectional view of the trigger mechanism of FIG. 5A in a second position.

With reference to FIGS. 5A and 5B, the fastener driver 10 includes a trigger mechanism 118 having two triggers—the first or "primary" trigger 26 and a second or "auxiliary" trigger 120. The auxiliary trigger 120 includes a nodule 124 that is capable of interfacing (i.e., depressing) with a lock-off button 128, which is further engageable with a first switch 132 of a circuit board 136. The auxiliary trigger 120 also includes an arcuate surface 140 that interfaces with (i.e., slides against) a corresponding arcuate surface 144 of the primary trigger 26. The primary trigger 26 includes a projection 148 that is engageable with a second switch 152 of the circuit board 136. The primary trigger 26 and the auxiliary trigger 120 are both moveable between a first position (FIG. 5A) and a second position (FIG. 5B).

In operation, a user grasps the handle portion 22 and pivots the auxiliary trigger 120 from the first position (FIG. 5A) toward the second position (FIG. 5B). By doing so, the arcuate surface 140 of the auxiliary trigger 120 no longer inhibits movement of the primary trigger 26, while simultaneously depressing the lock-off button 128 with the nodule 124. At this point, the primary trigger 26 is allowed to move between the first position (FIG. 5A) and the second position (FIG. 5B), and the first switch 132 of the circuit board 136 is depressed by the button 128. With reference to FIG. 5B, the projection 148 of the primary trigger 26 depresses the second switch 152 of the circuit board 136 once the primary trigger 26 is moved to the second position. After the triggers 26, 120 are depressed in sequence, thereby actuating the switches 132, 152 in sequence, a fastener driving operation is initiated. Specifically, the circuit board 136 sends a signal to supply power (via the battery pack 34) to actuate the compressor 30 for beginning the fastener driving operation as described above.

With continued reference to FIGS. 5A and 5B, the circuit board 136 may be further configured to activate a work light 154 positioned on the pneumatic fastener driver 10 using the first switch 132. Specifically, the movement of the auxiliary trigger 120 from the first position (FIG. 5A) to the second position (FIG. 5B) depresses the first switch 132 on the circuit board 136 as described above. Subsequently, the circuit board 136 sends a control signal to a power circuit board onboard the driver 10 to supply power (via the battery pack 34) to activate the work light 154. As such, the combination of the first and second triggers 26, 120 is operable to initiate the fastener driving operation and activate a work light 154 of the pneumatic fastener driver 10.

Figure 6A:
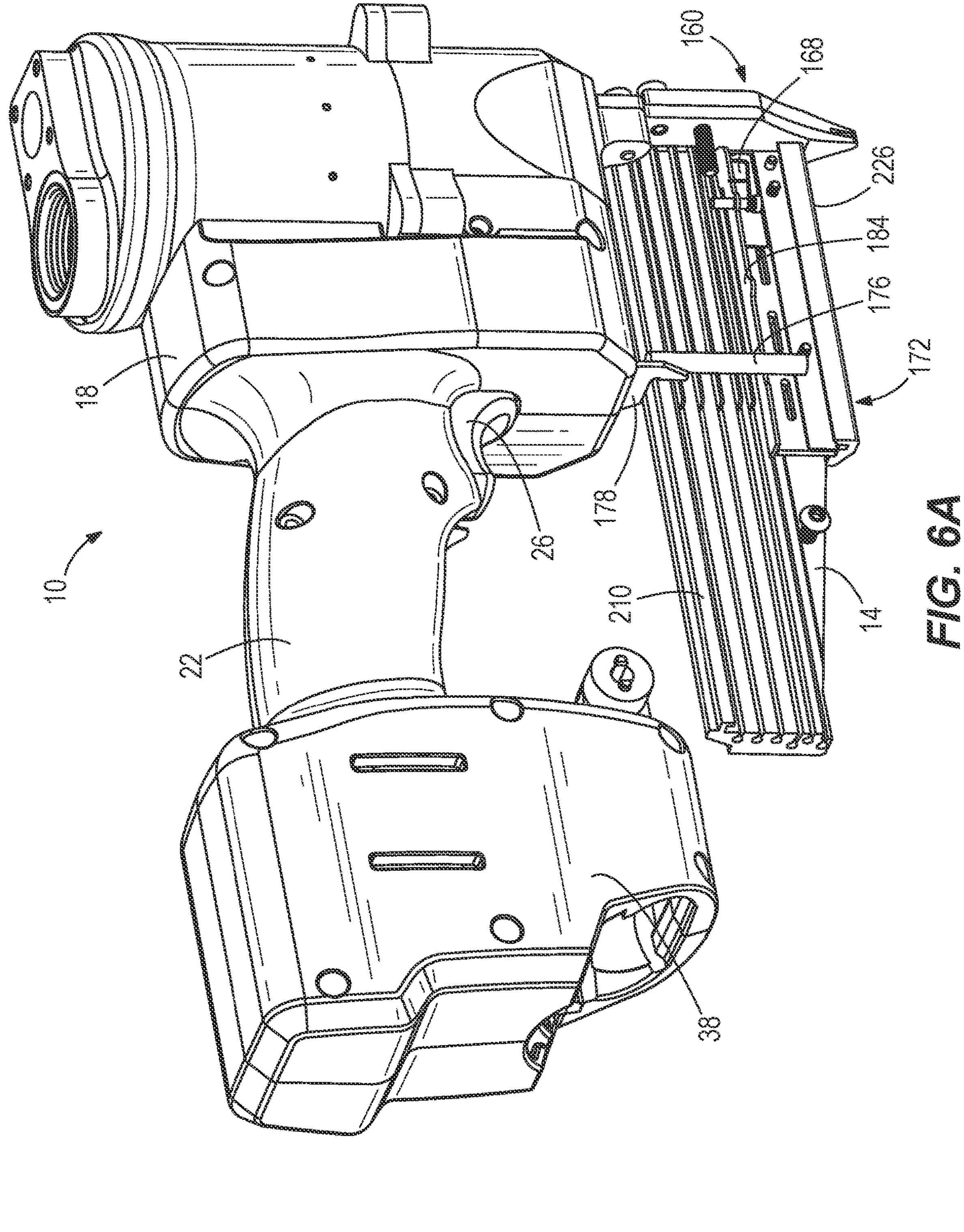
FIG. 6A is another perspective view of the pneumatic fastener driver of FIG. 1, illustrating a cutaway of a magazine and a rod of the trigger mechanism.
Figure 6B:
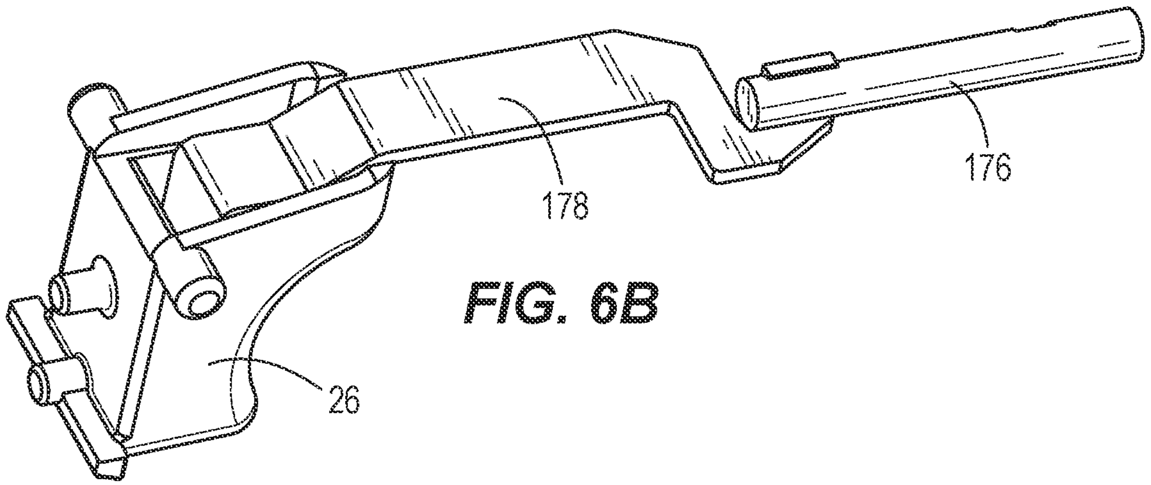
FIG. 6B is an enlarged perspective view of the rod of FIG. 6A coupled to the trigger mechanism of FIGS. 5A-5B.
Figure 6C:
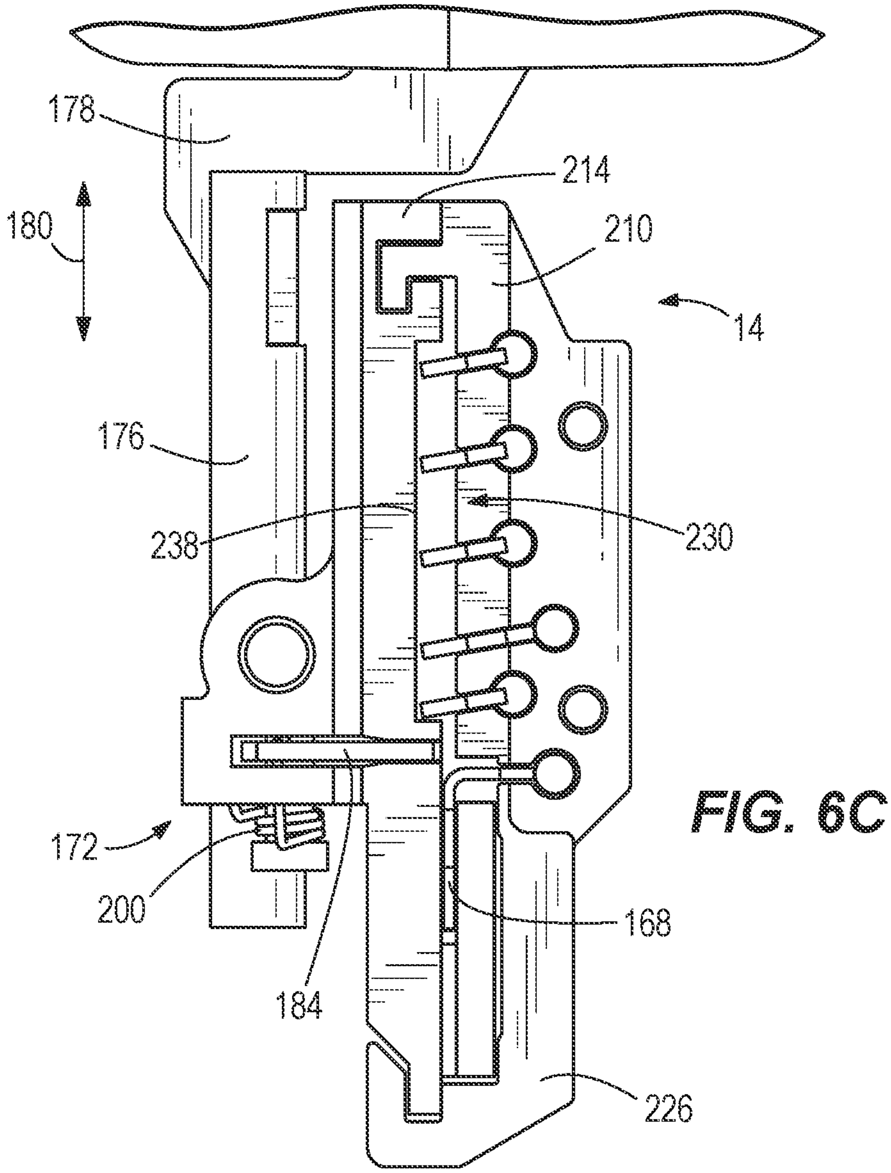
FIG. 6C is a partial cross-sectional view of the magazine, illustrating a dry-fire lockout mechanism.

With reference to FIGS. 6A-6C, the pneumatic fastener driver 10 includes a nosepiece 160 through which the fasteners 164 are driven into the workpiece, and the magazine 14 includes a pusher 168 for biasing the fasteners 164 in the magazine 14 toward the nosepiece 160. In addition, the fastener driver 10 includes a dry-fire lockout mechanism 172 to prevent the pneumatic fastener driver 10 from operating when the number of fasteners 164 remaining in the magazine 14 drops below a predetermined value.

With continued reference to FIGS. 6A-6C, the dry-fire lockout mechanism 172 includes a rod 176 that extends downwardly from the trigger 26, which is actuated by the user when a fastener driving operation is initiated, as described above. The rod 176 is coupled to the trigger 26 via an arm 178 extending from the trigger 26 to the rod 176 (FIG. 6B). As such, the rod 176 translates upward (i.e., along direction 180 shown in FIG. 6C) as the trigger 26 is actuated by the user.

With reference to FIGS. 7A-7D, the dry-fire lockout mechanism 172 also includes a latch 184 pivotably coupled to the magazine 14 having a front end 188 engageable with the fasteners 164 in the magazine 14 and a rear end 192. The rod 176 defines a cutout 196 (FIGS. 8A and 8B) that is configured to receive the rear end 192 of the latch 184 when fewer than a predetermined number of fasteners 164 remain in the magazine 14, thereby preventing further actuation of the trigger 26. In other words, the rear end 192 of the latch 184 is pivotable between a non-interfering position relative to the rod 176 in which upward movement of the rod 176 (i.e., in the direction 180) is not inhibited (FIGS. 8A and 8B), and an interfering position in which the rear end 192 of the latch 184 is engageable with the rod 176 for preventing upward movement of the rod 176 and the connected trigger 26 (FIGS. 9A and 9B).

Figure 7A:
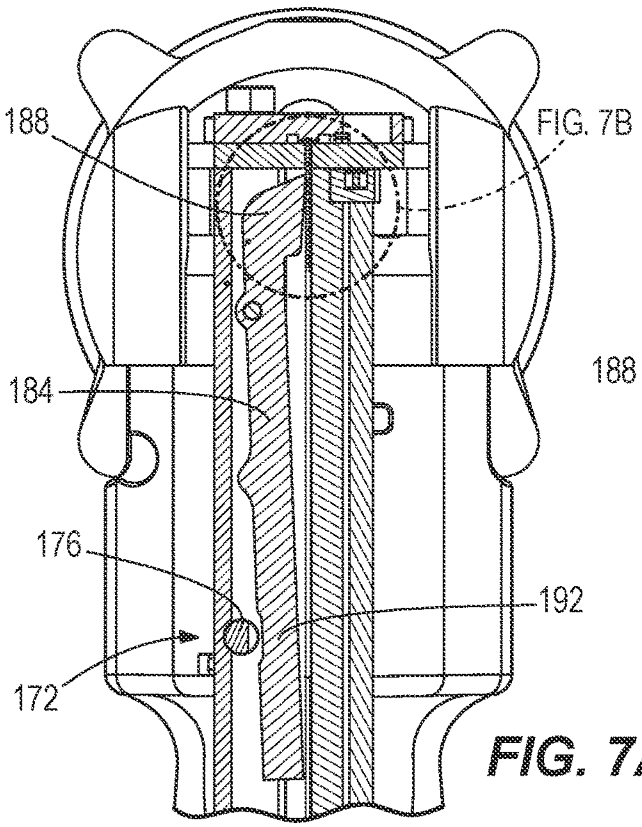
FIG. 7A is an enlarged, cross-sectional view of the dry-fire lockout mechanism of FIG. 6C including a latch in a non-interfering position relative to the rod.
Figure 7B:
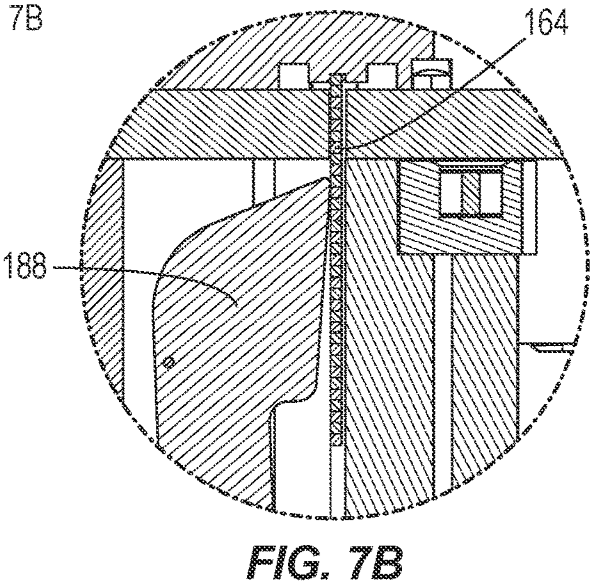
FIG. 7B is enlarged view of a portion of the dry-fire lockout mechanism of FIG. 7A.
Figure 7C:
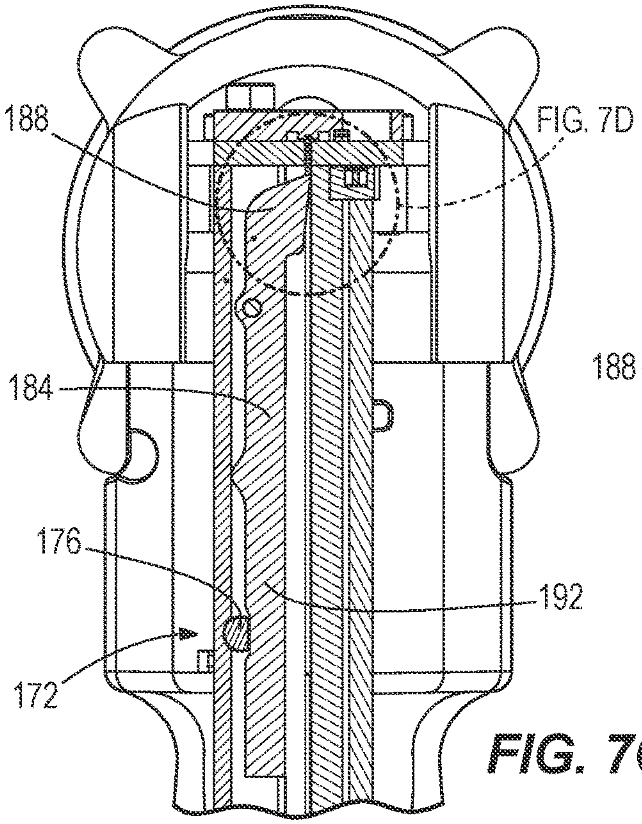
FIG. 7C is an enlarged, cross-sectional view of the latch of FIG. 7A in an interfering position relative to the rod.
Figure 7D:
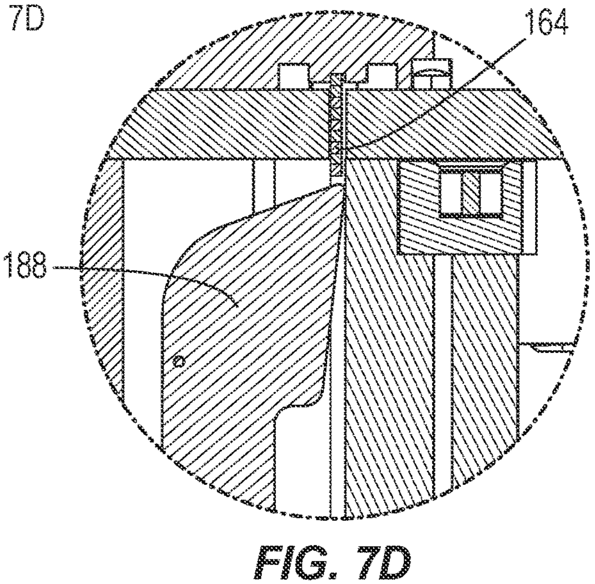
FIG. 7D is enlarged view of a portion of the dry-fire lockout mechanism of FIG. 7C.
Figure 8A:
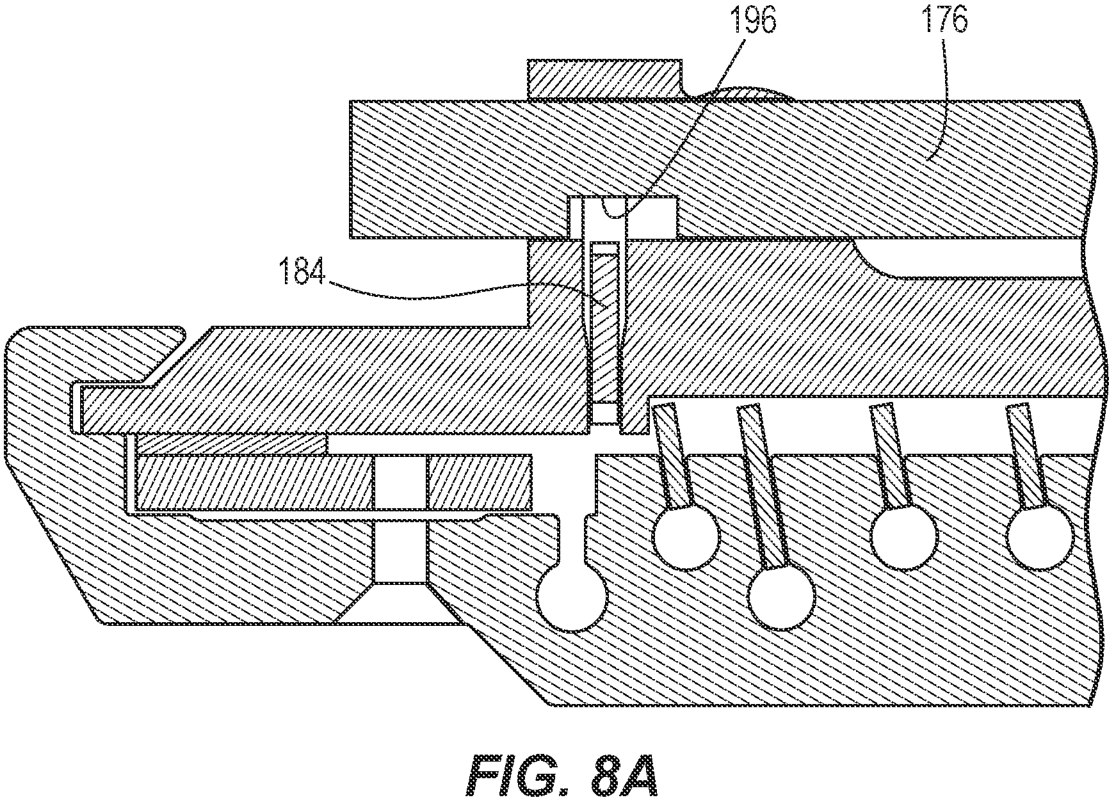
FIG. 8A is another enlarged, partial cross-sectional view of the latch in the non-interfering positon.
Figure 8B:
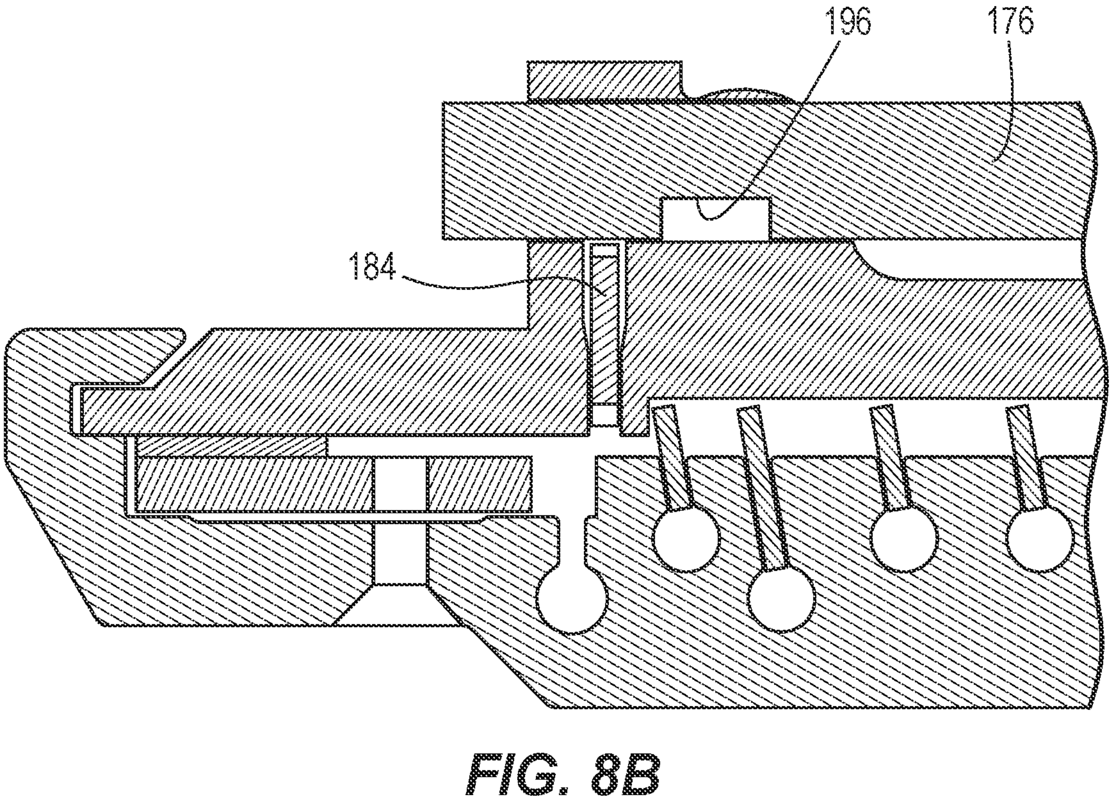
FIG. 8B is yet another enlarged, partial cross-sectional view of the latch in the non-interfering positon.

A torsion spring 200 (FIG. 6C) biases the latch 184 toward the interfering position shown in FIGS. 8A and 8B; however, sliding engagement of the front end 188 of the latch 184 with the remaining fasteners 164 in the magazine 14 maintains the latch 184 in the non-interfering position (FIGS. 7A and 8A-8B). Upon the front end 188 of the latch 184 disengaging the last of a predetermined number of fasteners 164 remaining in the magazine 14 (FIG. 7C), the torsion spring 200 pivots the latch 184 from the non-interfering position shown in FIGS. 8A and 8B to the interfering position shown in FIGS. 9A and 9B, in which the rear end 192 of the latch 184 is received in the cutout 196 in the rod 176 to inhibit upward movement of the rod 176 and the connected trigger 26.

In operation, with reference to FIGS. 8A and 8B, the number of fasteners 164 remaining in the magazine 14 is not less than the predetermined number of fasteners 164 such that the rear end 192 of the latch 184 is not received within the cutout 196 of the rod 176. Therefore, the movement of the rod 176 by the actuation of the trigger 26 is not prevented by the latch 184 (FIG. 7C). In other words, the rod 176 is able to move past the rear end 192 of the latch 194 when the number of fasteners 164 remaining in the magazine 14 is not less than the predetermined number of fasteners 164. In some embodiments, the predetermined number of fasteners remaining in the magazine 14 is five or less. For example, in one embodiment, the predetermined number of fasteners remaining in the magazine 14 is zero.

Figure 9A:
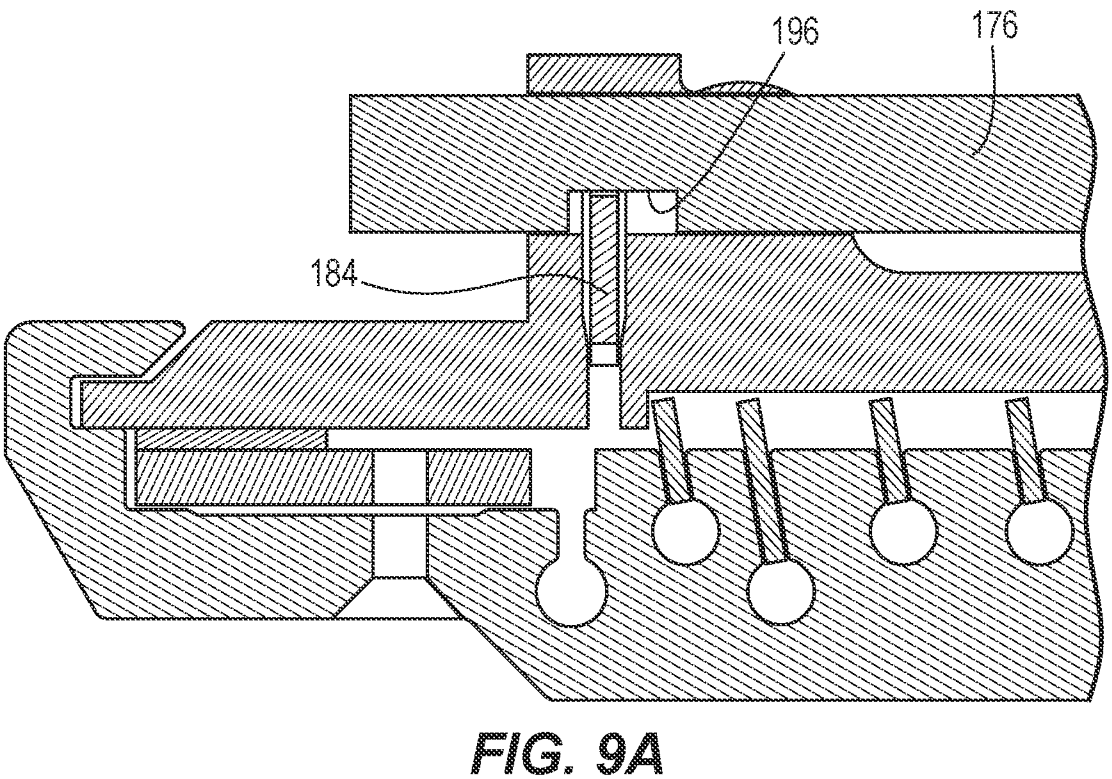
FIG. 9A is another enlarged, partial cross-sectional view of the latch in the interfering positon.
Figure 9B:
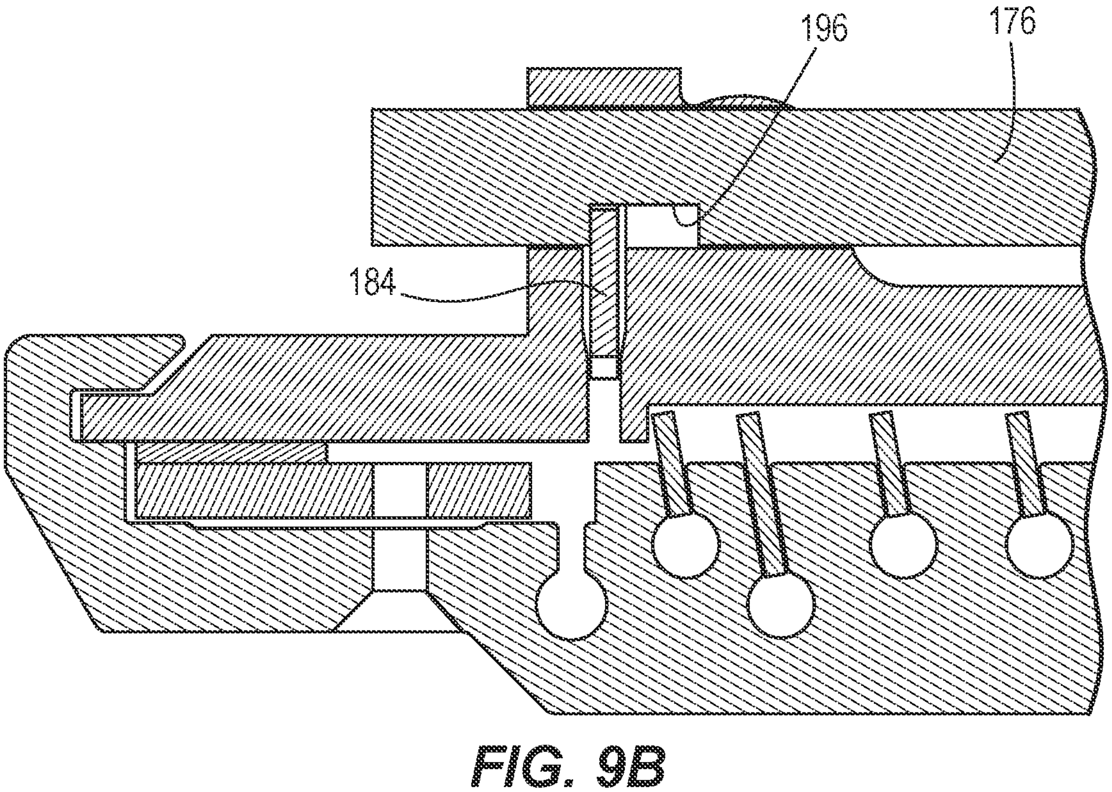
FIG. 9B is yet another enlarged, partial cross-sectional view of the latch in the interfering positon.

With reference to FIGS. 9A and 9B, the number of fasteners 164 remaining in the magazine 14 is less than the predetermined number of fasteners 164 such that the rear end 192 of the latch 184 is received within the cutout 196 of the rod 176. Therefore, the movement of the rod 176 by the actuation of the trigger 26 is prevented by the latch 184 (FIG. 9B). As such, the dry-fire lockout mechanism 172 prevents actuation of the trigger 26 to initiate a fastener driving operation when fewer than the predetermined number of fasteners 164 remains in the magazine 14.

Figure 10:
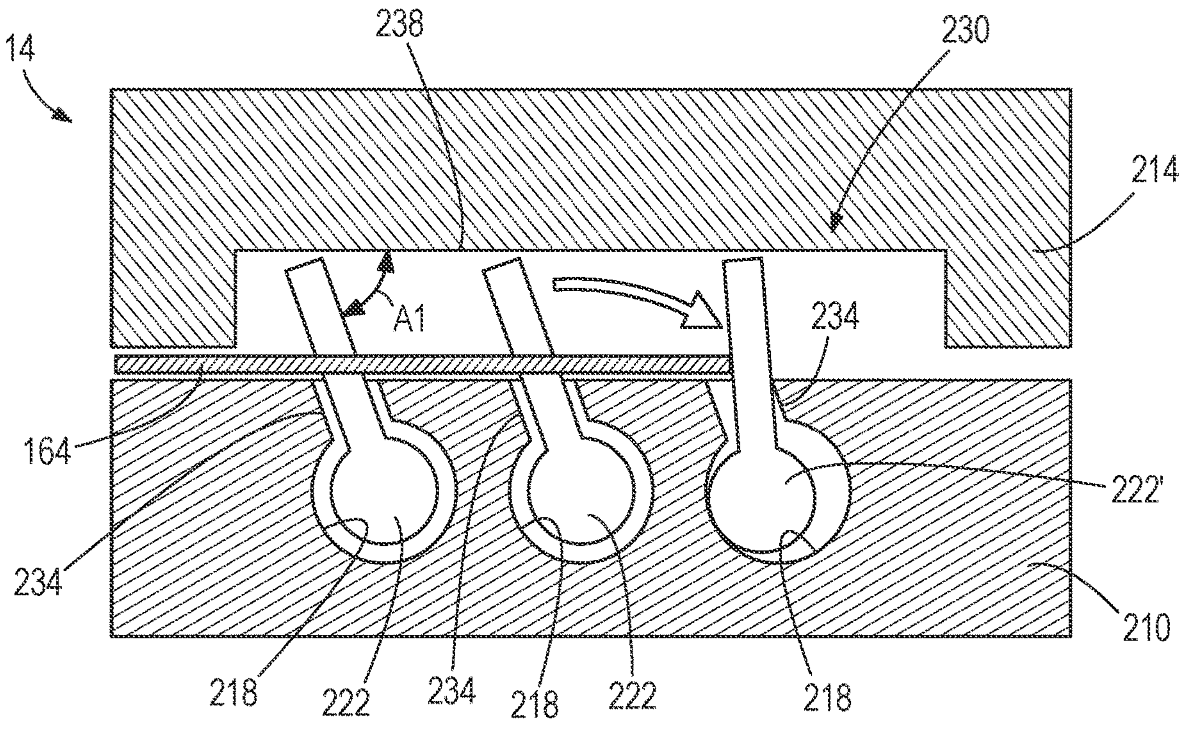
FIG. 10 is an enlarged, partial cross-sectional of the magazine of FIG. 6A, illustrating pusher pins within respective slots.

With reference to FIGS. 6A, 6C, and 10, the magazine 14 includes a base portion 210 and a cover 214. The base portion 210 defines a plurality of slots 218 configured to receive a plurality of guide pins 222 (FIG. 10). The slots 218 including the guide pins 222 are positioned at specific heights relative to a bottom edge 226 (FIG. 6A) of the magazine 14 corresponding to common lengths of the fasteners 164. The guide pins 222 in contact with the collated strip of fasteners 164 move with the movement of the pusher 168 under the biasing force of a spring (not shown).

With reference to FIG. 10, the cover 214 defines a single continuous longitudinal channel 230 in facing relationship with the slots 218. The channel 230 is configured to receive each end of the guide pins 222, which are slidable within the channel 230 with the movement of the pusher 168 toward the nosepiece 160. In addition, each of the slots 218 includes a slanted portion 234 relative to the cover 214 such that the ends of the guide pins 222 are positioned at an angle A1 relative to a back wall 238 defining the channel 230. In the illustrated embodiment, the angle A1 is about 50 degrees relative to the back wall 238. In other embodiments, the angle A1 is between about 40 degrees and about 60 degrees relative to the back wall 238. Specifically, the angle A1 of the guide pins 222 in the channel 230 may inhibit the collated strip of fasteners 164 from being separated by the drive blade 42 as the drive piston 70 is returning to its top-dead-center position, which might otherwise result in the fastener driver 10 jamming. In the example shown in FIG. 10, the guide pin 222' immediately above the collated strip of fasteners 164 is temporarily pivoted within its respective slot 218 to be substantially perpendicular to the back wall 238 when the drive piston 70 is returning to its top-dead-center position. The slanted portion 234 prevents the end of the guide pin 222' from exceeding an angle A1 greater than ninety degrees, thereby preventing substantial movement of the collated strip of fasteners 164 that might otherwise cause separation of the collated fastener strip leading to jamming of the fastener driver 10. In particular, the slanted portion 234 prevents the end of the guide pin 222' from exceeding an angle A1 greater than ninety degrees, thereby preventing substantial movement of the collated strip of fasteners 164 relative to the magazine 14 in a direction parallel with the drive blade 42.

Various features of the invention are set forth in the following claims.

What is claimed is:

1. A fastener driver comprising:
a housing including a handle having a trigger that is adjacent a grip of the handle;
a motor positioned within the housing;
an air compressor including a compressor cylinder and a compressor piston movable within the compressor cylinder in a reciprocating manner to compress air within the compressor cylinder;
a drive cylinder in selective fluid communication with the compressor cylinder;
a drive piston slidably disposed in the drive cylinder, the drive piston having a drive blade attached thereto; and
a drive train converting torque from the motor to a linear force applied to the compressor piston, causing the compressor piston to move in the reciprocating manner, the drive train including a drive shaft that is transverse to the drive cylinder,
wherein at least a portion of the drive train extends through the handle of the housing.

2. The fastener driver of claim 1, wherein the drive train includes a speed reduction mechanism that receives the torque from the motor.

3. The fastener driver of claim 2, wherein the speed reduction mechanism is a first speed reduction mechanism, and wherein the drive train includes a second speed reduction mechanism separate from the first speed reduction mechanism such that the first speed reduction mechanism and the second speed reduction mechanism is configured as a split gearbox.

4. The fastener driver of claim 1, wherein the drive shaft extends at least partially through the handle.

5. The fastener driver of claim 4, wherein the drive train includes a speed reduction mechanism upstream of the drive shaft.

6. The fastener driver of claim 4, wherein the drive train includes a speed reduction mechanism downstream of the drive shaft.

7. The fastener driver of claim 6, wherein the speed reduction mechanism is a gear train including a first gear, a second gear meshed with the first gear, and a third gear meshed with the second gear.

8. The fastener driver of claim 1, wherein the handle portion includes a first end and a second end, and wherein the drive train includes a first speed reduction mechanism positioned proximate the first end.

9. The fastener driver of claim 8, wherein the drive train includes a second speed reduction mechanism positioned proximate the second end.

10. The fastener driver of claim 9, wherein the housing includes a head portion adjacent the handle, the head portion supporting the air compressor, and wherein the second speed reduction mechanism is at least partially within the head portion.

11. The fastener driver of claim 1, wherein the drive train includes a crank arm assembly operatively coupled to the compressor piston.

12. The fastener driver of claim 1, further comprising a battery pack, wherein the battery pack provides power to the motor.

13. A fastener driver comprising:

a housing including a head portion, a battery attachment portion, and a handle extending therebetween and having a trigger that is adjacent a grip of the handle;

a motor positioned within the battery attachment portion;

a battery pack coupled to the battery attachment portion for providing power to the motor;

an air compressor including a compressor cylinder and a compressor piston movable within the compressor cylinder in a reciprocating manner to compress air within the compressor cylinder;

a drive cylinder in selective fluid communication with the compressor cylinder;

a drive piston slidably disposed in the drive cylinder, the drive piston having a drive blade attached thereto; and a drive train converting torque from the motor to a linear force applied to the compressor piston, causing the compressor piston to move in the reciprocating manner, wherein the drive train includes a drive shaft extending through the handle, the drive shaft oriented transverse to the drive cylinder.

14. The fastener driver of claim 13, wherein the drive train includes a speed reduction mechanism upstream of the drive shaft.

15. The fastener driver of claim 13, wherein the drive train includes a speed reduction mechanism downstream of the drive shaft.

16. The fastener driver of claim 13, wherein the handle includes a first end and a second end opposite the first end, and wherein a speed reduction mechanism is positioned proximate the first end.

17. The fastener driver of claim 16, wherein the drive train includes a second speed reduction mechanism positioned proximate the second end.

18. The pneumatic fastener driver of claim 16, wherein the drive shaft extends at least between the first and second ends.

19. The fastener driver of claim 13, wherein the drive train includes a speed reduction mechanism positioned within the head portion.

20. The fastener driver of claim 19, wherein the drive train includes a crank arm assembly positioned within the head portion, the crank arm assembly connected between the compressor piston and the speed reduction mechanism.

* * * * *